(12) United States Patent
Marinier et al.

(10) Patent No.: US 8,711,709 B2
(45) Date of Patent: Apr. 29, 2014

(54) METHOD AND APPARATUS FOR MONITORING FOR A RADIO LINK FAILURE

(75) Inventors: Paul Marinier, Brossard (CA); Stephen E. Terry, Northport, NY (US); Jean-Louis Gauvreau, La Praire (CA); Shankar Somasundaram, London (GB); Peter S. Wang, East Setauket, NY (US); Ghyslain Pelletier, Laval (CA); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 376 days.

(21) Appl. No.: 12/722,862

(22) Filed: Mar. 12, 2010

(65) Prior Publication Data
US 2011/0021154 A1 Jan. 27, 2011

Related U.S. Application Data

(60) Provisional application No. 61/256,687, filed on Oct. 30, 2009, provisional application No. 61/250,773, filed on Oct. 12, 2009, provisional application No. 61/248,264, filed on Oct. 2, 2009, provisional application No. 61/218,171, filed on Jun. 18, 2009, provisional application No. 61/159,649, filed on Mar. 12, 2009.

(51) Int. Cl.
*H04W 24/00* (2009.01)
*H04W 72/04* (2009.01)
*H04B 17/00* (2006.01)

(52) U.S. Cl.
USPC ........ 370/242; 370/329; 370/254; 455/67.11; 455/423

(58) Field of Classification Search
USPC ........ 370/241, 242, 254, 329; 455/67.11, 423
See application file for complete search history.

(56) References Cited

U.S. PATENT DOCUMENTS

| | | | |
|---|---|---|---|
| 7,551,597 B2 | 6/2009 | Nilsson et al. | |
| 7,864,724 B2 * | 1/2011 | Kaikkonen et al. | 370/318 |
| 8,351,922 B2 * | 1/2013 | Wang et al. | 455/423 |
| 2003/0207702 A1 * | 11/2003 | Chen | 455/574 |
| 2005/0281222 A1 | 12/2005 | Ranta-Aho et al. | |
| 2006/0280142 A1 | 12/2006 | Damnjanovic et al. | |
| 2007/0286155 A1 * | 12/2007 | Kaikkonen et al. | 370/350 |
| 2008/0019279 A1 * | 1/2008 | Kim et al. | 370/241 |
| 2009/0116378 A1 * | 5/2009 | Jen | 370/216 |
| 2009/0245178 A1 * | 10/2009 | Gholmieh et al. | 370/328 |
| 2009/0316575 A1 * | 12/2009 | Gholmieh et al. | 370/225 |

(Continued)

FOREIGN PATENT DOCUMENTS

WO 2006/086359 8/2006

OTHER PUBLICATIONS

CATT, "Considerations on Radio Link Failure in CA," 3GPP TSG RAN WG2 Meeting #67bis, Miyazaki, Japan, Oct. 12-16, 2009.

(Continued)

*Primary Examiner* — Ahmed Elallam
(74) *Attorney, Agent, or Firm* — Volpe and Koenig, P.C.

(57) ABSTRACT

Methods and apparatus are described for monitoring for a radio link failure in a long term evolution-advanced (LTE-A) system operated with carrier aggregation. The methods include criteria for determining radio link failure, recovery events, and the actions that a wireless transmit/receive unit (WTRU) may take upon the occurrence of such events.

12 Claims, 12 Drawing Sheets

(56) References Cited

U.S. PATENT DOCUMENTS

| | | | |
|---|---|---|---|
| 2010/0040004 A1* | 2/2010 | Damnjanovic et al. | 370/329 |
| 2010/0074201 A1* | 3/2010 | Wu | 370/329 |
| 2010/0113078 A1* | 5/2010 | Farajidana et al. | 455/507 |
| 2010/0118817 A1* | 5/2010 | Damnjanovic et al. | 370/329 |
| 2010/0142466 A1* | 6/2010 | Palanki et al. | 370/329 |
| 2010/0195507 A1* | 8/2010 | Marinier et al. | 370/242 |
| 2011/0217973 A1* | 9/2011 | Sagfors et al. | 455/423 |
| 2012/0120838 A1* | 5/2012 | Farajidana et al. | 370/252 |
| 2013/0095818 A1* | 4/2013 | Levy et al. | 455/423 |

OTHER PUBLICATIONS

Huawei, "Discussion on RLF in DC-HSDPA," 3GPP TSG-RAN WG2 #63, R2-084402 (Aug. 18-22, 2008).

Huawei, "RLF consideration in DC-HSDPA," 3GPP TSG-RAN WG2 Meeting #64, R2-086693 (Nov. 10-14, 2008).

Qualcomm Europe, "Notion of Anchor Carrier in LTE-A," 3GPP TSG RAN WG1 #55bis, R1-080356 (Jan. 12-16, 2009).

Third Generation Partnership Project, "Technical Specification Group Radio Access Network; Evolved Universal Terrestrial Radio Access (E-UTRA); Physical Layer Procedures (Release 8)," 3GPP TS 36.213 V8.5.0 (Dec. 2008).

Third Generation Partnership Project, "Technical Specification Group Radio Access Network; Evolved Universal Radio Access (E-UTRA); Physical Layer Procedures (Release 8)," 3GPP TS 36.213.V8.8.0 (Sep. 2009).

Third Generation Partnership Project, "Technical Specification Group Radio Access Network; Evolved Universal Radio Acccess (E-UTRA); Physical Layer Procedures (Release 9)," 3GPP TS 36.213.V9.0.1 (Dec. 2009).

Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 V8.4.0 (Dec. 2008).

Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 V8.8.0 (Jan. 2010).

Third Generation Partnership Project, "Technical Specification Group Radio Access Network; Evolved Universal Terrestrial Radio Access (E-UTRA) Radio Resource Control (RRC); Protocol Specification (Release 9)," 3GPP TS 36.331 V9.1.0 (Jan. 2010).

Third Generation Partnership Project, "Technical Specification Group Radio Access Network; Evolved Universal Terrestrial Radio Access (E-UTRA); Requirements for Support of Radio Resource Management (Release 8)," 3GPP TS 36.133 V8.4.0 (Dec. 2008).

Third Generation Partnership Project, "Technical Specification Group Radio Access Network; Evolved Universal Terrestrial Radio Access (E-UTRA); Requirements for Support of Radio Resource Management (Release 8)," 3GPP TS 36.133 V8.8.0 (Dec. 2009).

Third Generation Partnership Project, "Technical Specification Group Radio Access Network; Evolved Universal Terrestrial Radio Access (E-UTRA); Requirements for Support of Radio Resource Management (Release 9)," 3GPP TS 36.133 V9.2.0 (Dec. 2008).

Third Generation Partnership Project, "Technical Specification Group Radio Access Network; Evolved Universal Terrestrial Radio Access (E-UTRA); Physical Layer Procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical Layer Procedures (Release 9)," 3GPP TS 36.213 V9.0.1 (Dec. 2009).

* cited by examiner

US 8,711,709 B2

METHOD AND APPARATUS FOR MONITORING FOR A RADIO LINK FAILURE

CROSS REFERENCE TO RELATED APPLICATIONS

This application claims the benefit of U.S. Provisional Application No. 61/159,649 filed Mar. 12, 2009, U.S. Provisional Application No. 61/218,171 filed Jun. 18, 2009, U.S. Provisional Application No. 61/248,264 filed Oct. 2, 2009, U.S. Provisional Application No. 61/250,773 filed Oct. 12, 2009, and U.S. Provisional Application No. 61/256,687 filed Oct. 30, 2009, which are incorporated by reference as if fully set forth.

FIELD OF INVENTION

This application is related to wireless communications.

BACKGROUND

Wireless communication systems keep evolving to meet the needs for providing continuous and faster access to a data network. In order to meet these needs, wireless communication systems may use multiple carriers for the transmission of data. A wireless communication system that uses multiple carriers for the transmission of data may be referred to as a multi-carrier system. The use of multiple carriers is expanding in both cellular and non-cellular wireless systems.

A multi-carrier system may increase the bandwidth available in a wireless communication system according to a multiple of how many carriers are made available. For instance, a dual-carrier system may double the bandwidth when compared to a single carrier system and a tri-carrier system will triple the bandwidth when compared to a single carrier system. In addition to this throughput gain, diversity and joint scheduling gains may also be expected. This may result in improving the quality of service (QoS) for end users. Further, multiple carriers may be used in combination with multiple-input multiple-output (MIMO).

In the current third generation partnership project (3GPP) release 8 (R8) and release 9 (R9) specifications for single carrier long term evolution (LTE), the wireless transmit/receive unit (WTRU) ensures that its radio connection to the system (i.e., the radio resource control (RRC) connection), once established, is maintained. The WTRU performs radio link monitoring and, upon detection of physical layer problems, increases its monitoring activity until it recovers from the physical layer problems. If the problems persist and conditions to recover from the physical layer problems cannot be met, the WTRU assumes a radio link failure (RLF). Upon RLF, the WTRU performs a recovery procedure, (e.g., an RRC connection re-establishment).

More specifically, radio link monitoring in currently specified LTE systems (with one carrier) is described in several 3GPP documents. A WTRU monitors the downlink (DL) radio quality against thresholds ($Q_{out}$ and $Q_{in}$) every frame or every discontinuous reception (DRX) period, depending on whether or not DRX is activated. The physical layer indicates in-synch or out-of-synch to higher layers, (e.g., an RRC layer), when the radio link quality is better than $Q_{in}$ or worse than $Q_{out}$ (respectively). The time periods for this evaluation depend on whether DRX is utilized or not. The radio link quality is measured in terms of the block error rate of a hypothetical physical downlink control channel (PDCCH) transmission, taking into account the physical control format indicator channel (PCFICH) errors with a certain assumed transmission configuration.

Upon the reception of a predefined number (e.g., N310) of consecutive out-of-synch indications, the RRC detects that a physical layer problem has occurred and starts a recovery timer (e.g., T310). If the recovery timer expires before a predefined number (e.g., N311) of consecutive in-synch indications are received, (i.e., the "recovery of a physical layer problem"), the RRC determines that RLF has occurred and either initiates a connection re-establishment procedure or the release of the RRC connection, depending on whether access stratum (AS) security has been activated or not. While the recovery timer is running, the evaluation period radio link quality evaluation is as if DRX is not used, regardless of whether it is being configured or not. This implies that the WTRU turns on its receiver for the purpose of evaluating radio link quality, even if no reception of data is expected as per DRX rules.

In addition, the RRC may also determine that RLF has occurred upon an indication from the medium access control (MAC) of a random access problem, or an indication from the radio link control (RLC) that the maximum number of retransmissions has been reached.

To further improve achievable throughput and coverage of LTE-based radio access systems, and to meet the international mobile telecommunications-advanced (IMT-Advanced) requirements of 1 Gbps and 500 Mbps in the DL and uplink (UL) directions respectively, LTE-advanced (LTE-A) is currently under study in the 3GPP standardization body. One improvement proposed for LTE-A is the carrier aggregation and support of flexible bandwidth arrangement feature. One motivation is to allow DL and UL transmission bandwidths to exceed 20 MHz in release 8 (R8) LTE, (e.g., 40 MHz to 100 MHz).

When the WTRU is operating on multiple carriers, the criteria for radio link monitoring and the actions to take upon detection of a radio link problem need to be redefined, as compared to a single-carrier case. This is because of the possibility of different radio conditions over different component carriers and the modifications that need to be made to the control channel structure and related procedures compared to the single-carrier case.

SUMMARY

Methods and apparatus are described for monitoring for a radio link failure in a LTE-A system operated with carrier aggregation. The methods include criteria for determining radio link failure, recovery events, and the actions that a WTRU may take upon the occurrence of such events.

BRIEF DESCRIPTION OF THE DRAWINGS

A more detailed understanding may be had from the following description, given by way of example in conjunction with the accompanying drawings wherein.

DETAILED DESCRIPTION

Figure 1:
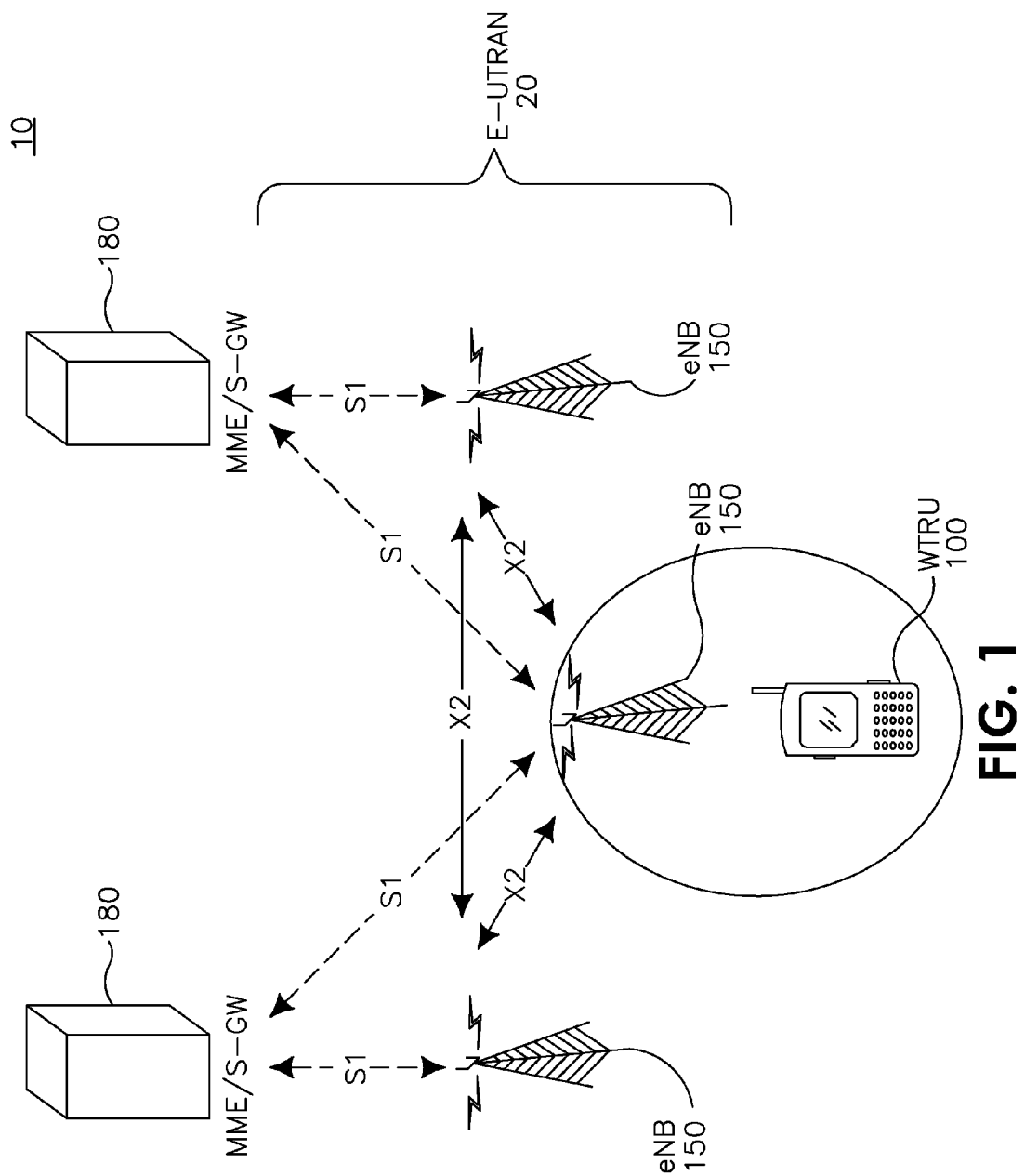
FIG. 1 shows an LTE wireless communication system/access network.

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of device capable of operating in a wireless environment.

When referred to hereafter, the term "base station" includes but is not limited to a Node-B, a site controller, an access point (AP), or any other type of interfacing device capable of operating in a wireless environment.

When referred to hereafter, the term "primary component carrier (PCC)" includes, without loss of generality, a carrier of a WTRU configured to operate with multiple component carriers for which some functionality, (e.g., derivation of security parameters and non-access stratum (NAS) information), may be applicable only to that component carrier. The WTRU may be configured with at least one PCC for the downlink (DL PCC) and one for the uplink (UL PCC). Consequently, a carrier which is not a PCC of the WTRU is hereafter referred to as a secondary component carrier (SCC).

For a WTRU configured to operate with multiple component carriers, PDCCH monitoring and/or physical downlink shared channel (PDSCH) reception for a PCC (if configured) is typically activated and may be governed by DRX (if configured). PDCCH monitoring (if configured) and/or PDSCH reception for a configured SCC may be either activated or deactivated, and may additionally be governed by DRX (if configured) when activated.

When the WTRU is operating with multiple component carriers, cross-carrier scheduling, (i.e., scheduling across carriers using PDCCH), may be supported. When cross-carrier scheduling is possible, monitoring of PDCCH may not be necessary in all configured and/or active carriers.

When referred to hereafter, the term "PDCCH carrier" includes a carrier for which the WTRU is configured to monitor PDCCH. When the WTRU is operating with multiple component carriers, the WTRU may be configured with one or more PDCCH carrier(s).

When referred to hereafter, the term "anchor carrier" includes a PDCCH carrier for which the WTRU additionally monitors for downlink assignments and/or uplink grants which may be applicable to a different carrier of the WTRU's configuration. When the WTRU is operating with multiple component carriers, the WTRU may be configured with one or more anchor carriers.

When referred to hereafter, the term "scheduled set" includes at least one anchor carrier and at least one non-anchor carrier (possibly itself a PDCCH carrier) where the anchor carrier can provide control signaling also for the non-anchor carrier(s) in the set. When the WTRU is operating with multiple component carriers, the WTRU may be configured with one or more scheduled set(s). For example, when a WTRU is configured to operate with two or more carriers, (i.e., frequencies or cells), each of these carriers may have distinct characteristics and logical association with the network and the WTRU, and the operating frequencies may be grouped to form more than one scheduled set where each set includes at least a primary or anchor carrier as well as a secondary carrier. Alternatively, the WTRU may be configured with a single scheduled set, (i.e., with a single primary or anchor carrier and one or more secondary carriers).

FIG. 1 shows an LTE wireless communication system/access network 10 that includes an evolved-universal terrestrial radio access network (E-UTRAN) 20. The E-UTRAN 20 includes a WTRU 100 and several evolved Node-Bs, (eNBs) 150. The WTRU 100 is in communication with an eNB 150. The eNBs 150 may implement an interface with each other using an X2 interface. Each of the eNBs 150 interface with a mobility management entity (MME)/serving gateway (S-GW) 180 through an S1 interface. Although a single WTRU 100 and three eNBs 150 are shown in FIG. 1, it should be apparent that any combination of wireless and wired devices may be included in the LTE wireless communication system/access network 10.

Figure 2:
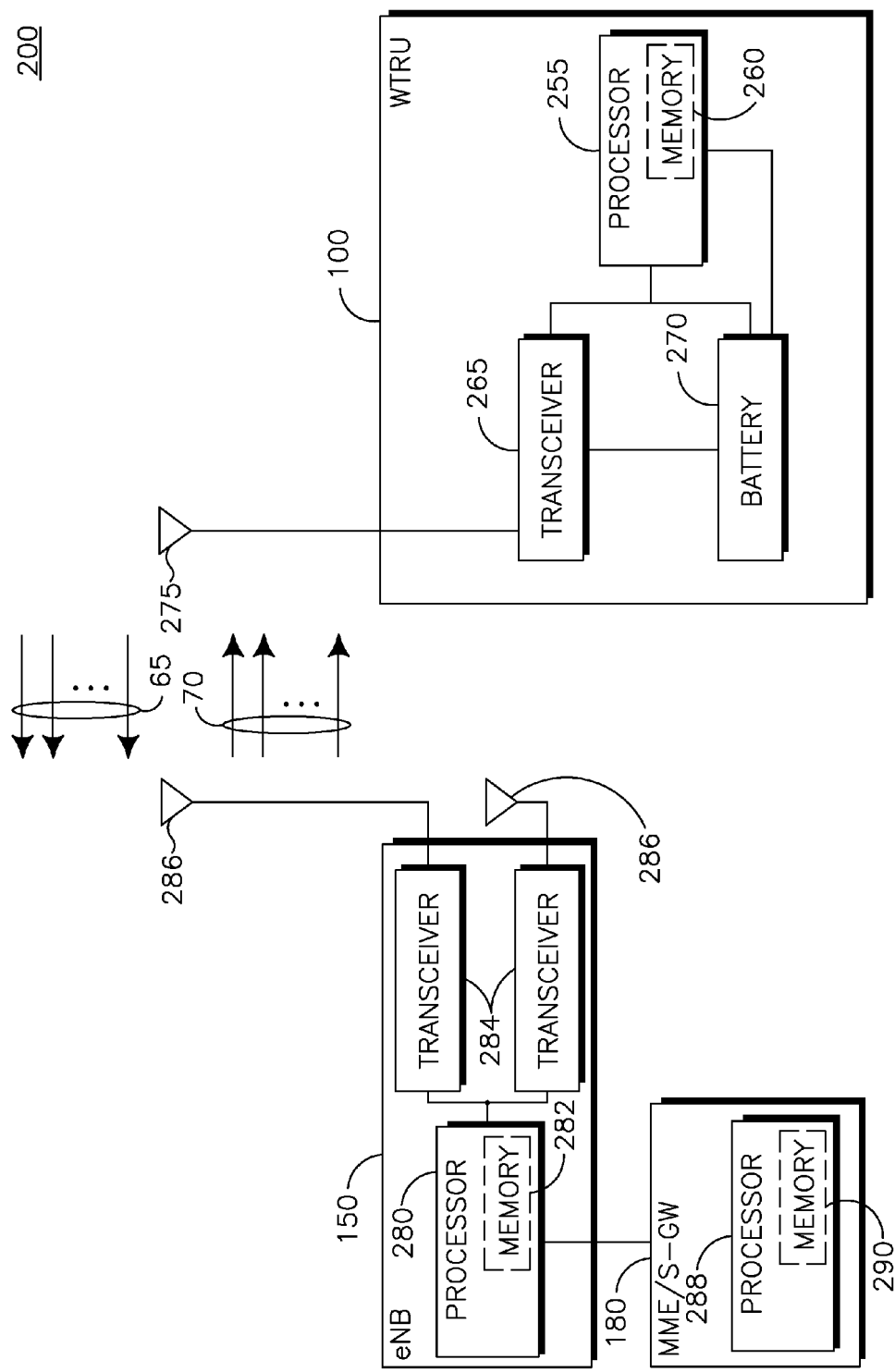
FIG. 2 is a block diagram of an LTE wireless communication system.

FIG. 2 is a block diagram of an LTE wireless communication system 200 including the WTRU 100, the eNB 150, and the MME/S-GW 180. As shown in FIG. 2, the WTRU 100, the eNB 150 and the MME/S-GW 180 are configured to perform a method of monitoring a radio link with aggregated carriers.

In addition to the components that may be found in a typical WTRU, the WTRU 100 includes a processor 255 with an optional linked memory 260, at least one transceiver 265, an optional battery 270, and an antenna 275. The processor 255 is configured to perform a method of maintaining validity of system information with aggregated carriers. The transceiver 265 is in communication with the processor 255 and the antenna 275 to facilitate the transmission and reception of wireless communications. The transceiver 265 includes a transmitter and a receiver (not shown individually). In case a battery 270 is used in the WTRU 210, it powers the transceiver 265 and the processor 255.

In addition to the components that may be found in a typical eNB, the eNB 150 includes a processor 280 with an optional linked memory 282, transceivers 284, and antennas 286. The processor 280 is configured to perform a method of monitoring a radio link with aggregated carriers. The transceivers 284 are in communication with the processor 280 and antennas 286 to facilitate the transmission and reception of wireless communications. The eNB 150 is connected to the MME/S-GW 180 which includes a processor 288 with an optional linked memory 290.

As shown in FIG. 2, the WTRU 100 is in communication with the Node-B 150, and both are configured to perform a method wherein UL transmissions from the WTRU 100 are transmitted to the Node-B 150 using multiple UL carriers 65, and downlink transmissions are handled using multiple carriers 70.

Figure 3:
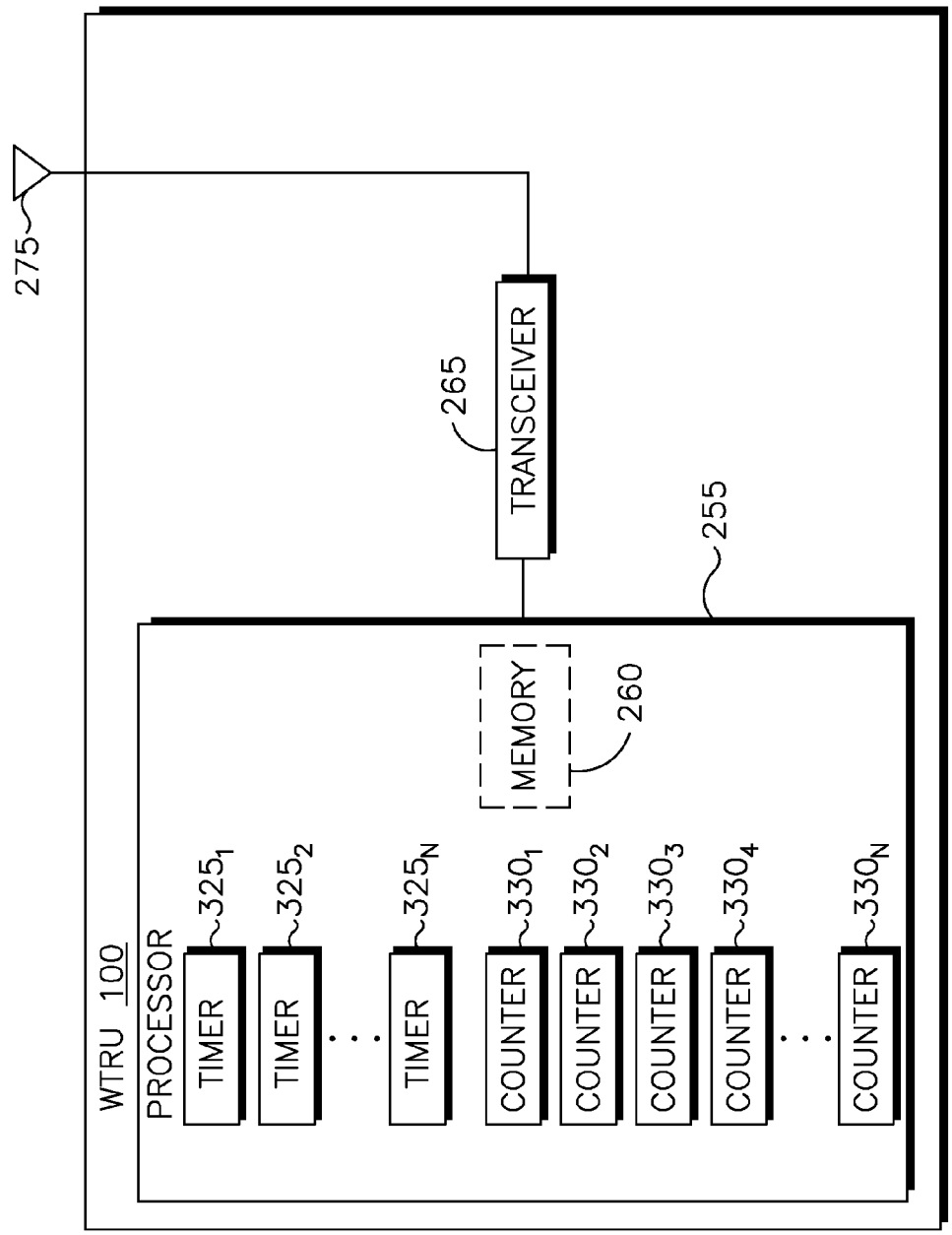
FIG. 3 shows additional details of a processor in a WTRU in the system of FIG. 2.

FIG. 3 shows additional details of the processor 255 in the WTRU 100. As shown in FIG. 3, the processor 255 may include a plurality of recovery timers $325_1, 325_2, \ldots, 325_N$ and a plurality of counters $330_1, 330_2, 330_3, 330_4, \ldots, 330_N$.

Although terminology specific to LTE or LTE-A systems is used to describe various solutions for radio link monitoring herein, it should be understood that evolved high speed packet access (HSPA) systems employing multiple carriers or cells are also applicable to these solutions.

Several possible approaches may be defined for carrier aggregation in terms of the placement of the UL/DL control channels on the component carriers. The solution for radio link monitoring may depend on which of these control channel approaches is used.

Radio Link Monitoring

As shown in FIG. 3, a single set of timers 325 and counters 330 in the processor 255 of the WTRU 100 may be used to perform radio link monitoring for the purpose of determining that radio link failure has occurred. In this method, the WTRU 100 performs the detection and recovery of physical layer problems using a single set of counters (e.g., N310, N311)

and a single recovery timer (e.g., T310) to detect a radio link failure. Upon detection of a radio link failure, the WTRU 100 performs either an RRC connection re-establishment procedure or an RRC connection release procedure, (depending on whether AS security is activated or not).

Radio link monitoring for the purpose of radio link failure detection may be based on in-synch and out-of-synch indications derived from a primary DL carrier. In this method, one specific DL carrier amongst the set of different component carriers activated for a WTRU is used for radio link monitoring purposes. Thus, the physical layer reports in-synch indications and out-of-synch indications to the RRC layer at least from the DL carrier monitored for the purpose of radio link failure, (i.e., a primary DL carrier); indications may be reported for other DL carriers as well for purposes other than radio link failure detection, (e.g., for management of the set of configured component carriers (e.g., the secondary carriers)).

Figure 4:
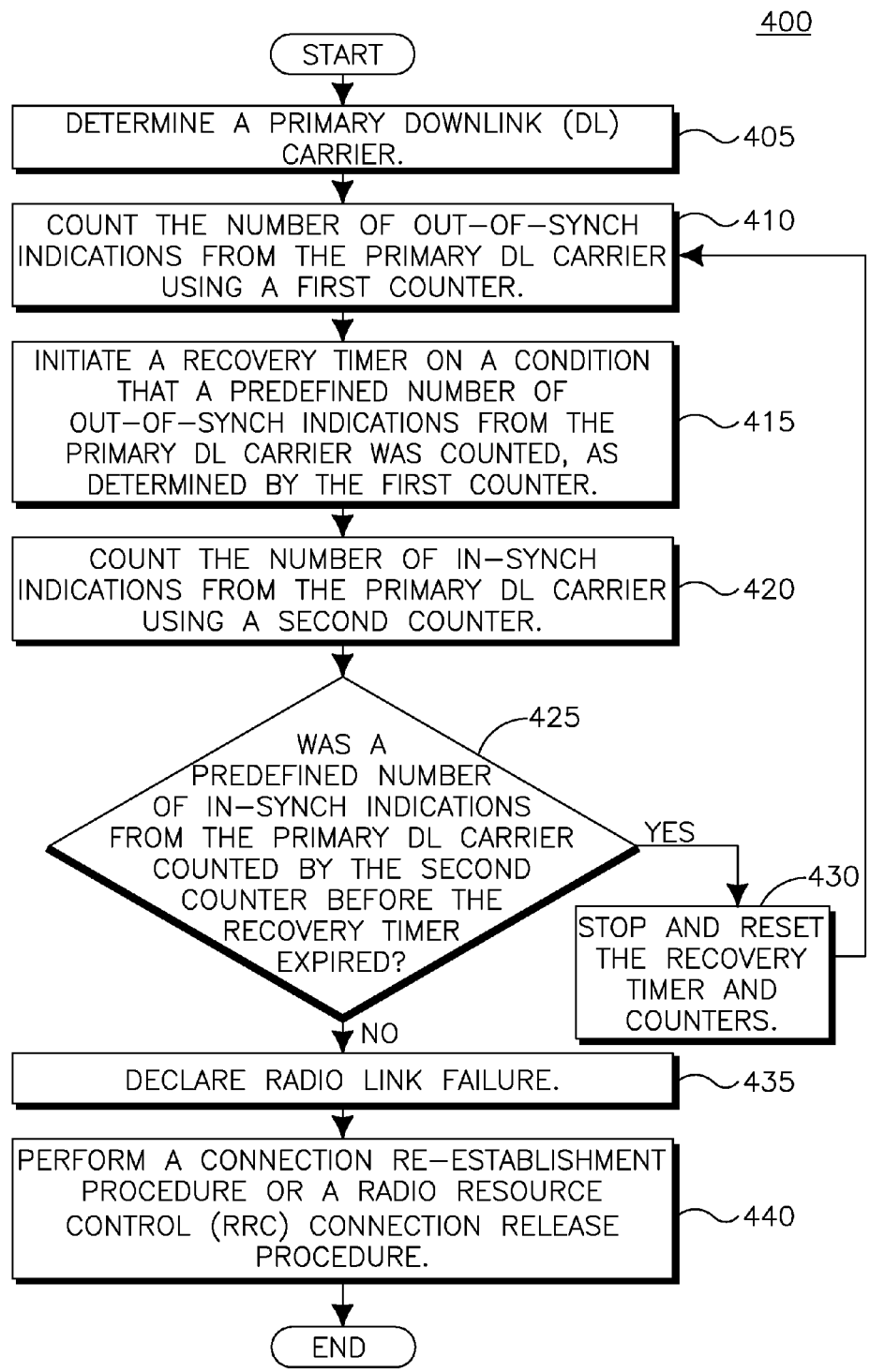
FIGS. 4, 5A, 5B, 6, 7A, 7B and 8 are flow charts of procedures for monitoring carriers.

As shown in FIG. 4, a procedure (400) for monitoring a radio link includes determining (i.e., identifying) a primary DL carrier (405) among a set of component carriers configured for the WTRU 100. At least one primary DL carrier(s) may be identified according to one or a combination of the following methods:

1) A primary DL carrier is obtained from the network through RRC signaling (dedicated or from system information). Such signaling may be provided at the same time the WTRU is being configured (or re-configured) with multiple carriers. The indication of which carrier is the primary DL carrier may be explicit or implicit. For example, the primary DL carrier may implicitly be the first carrier provided in an RRC configuration message. Alternatively, the primary DL carrier may implicitly be the DL carrier which the WTRU was already operating on at the time it received an RRC message configuring it with additional carriers. If the WTRU is being configured or re-configured with a single DL carrier, this carrier may implicitly be the primary DL carrier.

2) A DL anchor carrier that provides PDCCH signaling is determined to be the primary carrier. In particular, if the WTRU is configured with a single DL anchor carrier, (i.e., the WTRU is configured with a single scheduled set), the WTRU determines this carrier to be its primary carrier.

3) The WTRU may determine a primary DL carrier from among a plurality of configured and active PDCCH carriers for which the WTRU monitors PDCCH, e.g., active DL carriers that are in "active time" as per DRX rules (i.e., the primary DL carrier varies dynamically based on PDDCH activity on the primary DL carrier and other DL carriers). There may be a predefined or signaled priority between DL carriers to determine which one is selected in case there are more than one DL carriers that are in active time and in case a single DL carrier is selected. If no DL carrier is actively monitoring PDCCH, e.g., is in DRX active time, the primary carrier may be determined from among the set of DL carriers configured or activated for the WTRU. There may also be a predefined or signaled priority between DL carriers for this case.

Referring again to FIG. 4, the procedure 400 further includes counting the number of out-of-synch indications from the primary DL carrier (410) using a first counter $330_1$ (e.g., N310), and initiating a recovery timer $325_1$ (e.g., T310) on a condition that a predefined number of out-of-synch indications from the primary carrier was counted (415), as determined by the first counter $330_1$. The procedure (400) further includes counting the number of in-synch indications from the primary DL carrier (420) using a second counter $330_2$, and determining whether a predefined number of in-synch indications from the primary DL carrier was counted by the second counter $330_2$ before the recovery timer $325_1$ expired (425). If the number of in-synch indications from the primary DL carrier reaches the predefined number of in-synch indications, the recovery timer $325_1$ is stopped and reset, along with the first and second counters $330_1$ and $330_2$ (430). If the number of in-synch indications from the primary DL carrier does not reach the predefined number of in-synch indications, a radio link failure is declared (435) and either a connection re-establishment procedure or an RRC connection release procedure is performed (440).

Radio link monitoring may also be based on a function to derive in-synch indications and out-of-synch indications across multiple DL carriers within a given period of time, which time period would typically be equivalent to the in-synch/out-synch measurement frequency, e.g., one subframe. In this method, the physical layer measures in-synch and out-of-synch indications from multiple DL carriers, (hereinafter referred to as a "set of monitored DL carriers"), and applies a function to combine these indications into a single in-synch indication or a single out-of-synch indication that may be reported to the RRC layer. Such a combination may, for example, may be performed using one or more of the following methods:

1) A combined in-synch indication is reported to the RRC if at least one in-synch indication is measured for a DL carrier from the set of monitored DL carriers;

2) A combined in-synch indication is reported to the RRC if the number of in-synch indications is higher (or higher or equal) than the number of out-of-synch indications for the carriers within the set of monitored DL carriers.

3) Otherwise, if in-synch indications cannot be reported according to, e.g., one of the above methods, a combined out-synch indication is reported to the RRC.

Figure 5A:
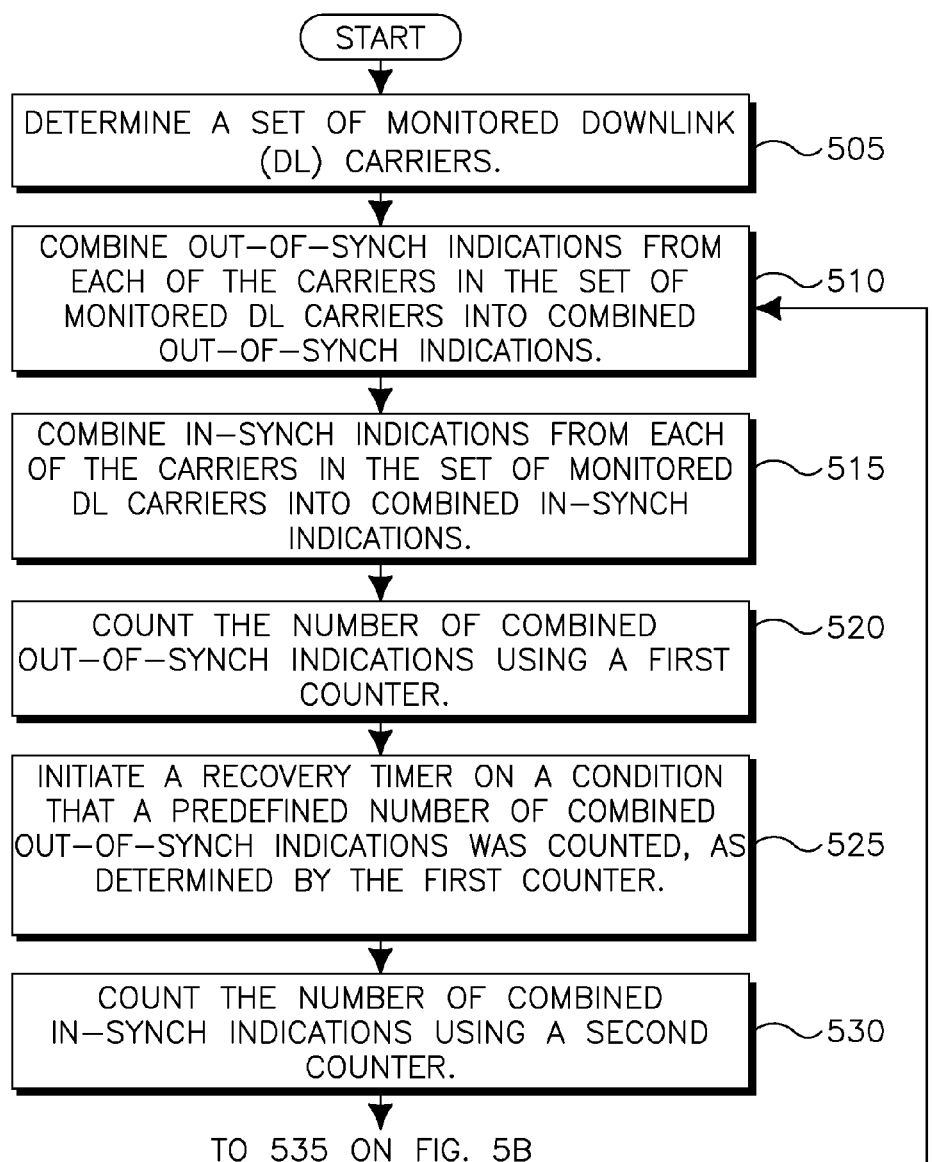
Figure 5B:
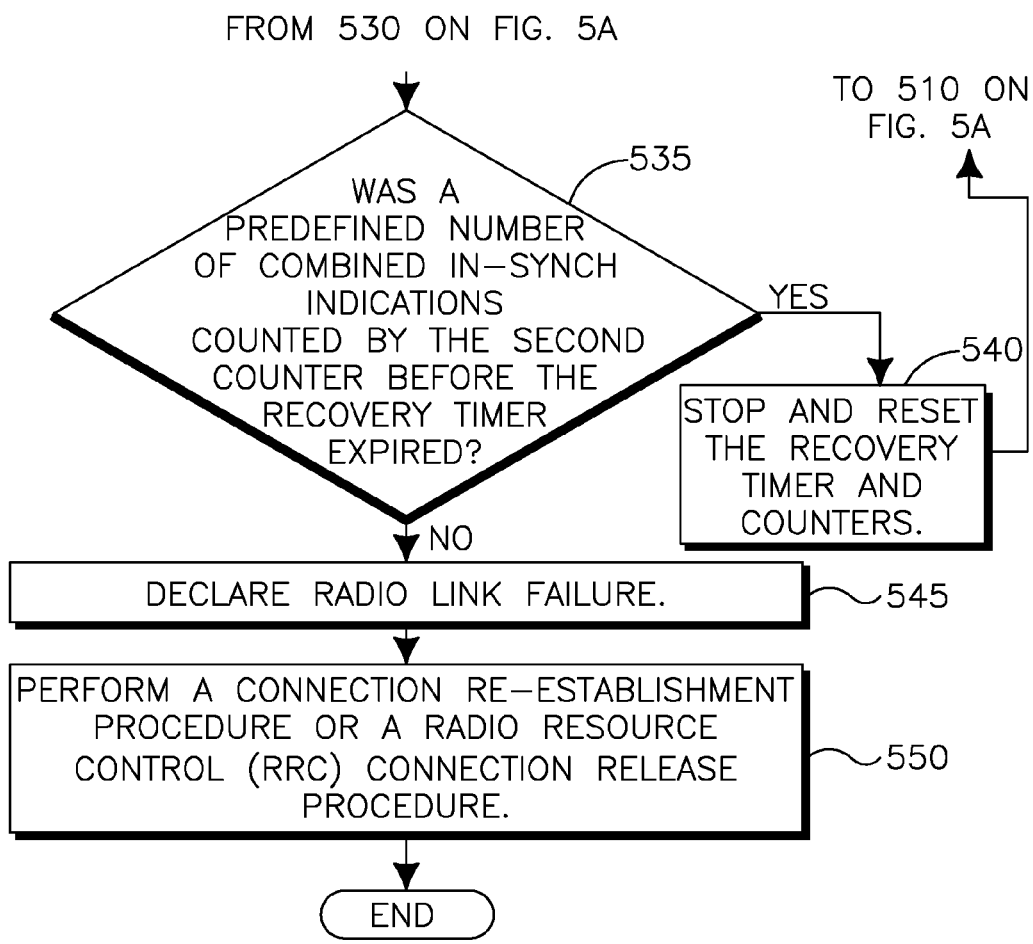

As shown in FIGS. 5A and 5B, a procedure 500 for monitoring radio links includes determining a set of monitored DL carriers (505). This set of monitored DL carriers may be determined according to one or a combination of the following methods:

1) The set of monitored DL carriers is provided by the network through RRC signaling (dedicated or from system information). The set may be defined to be the same as the set of configured and/or activated DL carriers for this WTRU.

2) The set of monitored DL carriers is a set of one or more anchor carriers monitored by the WTRU.

3) The WTRU may determine (i.e., identify) those PDCCH carriers (or those primary or anchor DL carriers) for which the WTRU monitors the PDCCH in a given subframe, e.g., PDCCH carriers that are configured and activated and/or in "active time" as per DRX operation (i.e., the set of monitored DL carriers vary dynamically based on PDDCH activity). In case the WTRU does not monitor PDCCH for any DL carrier, (or for any primary or anchor DL carrier), e.g., no DL carrier is in DRX active time, the set of monitored DL carriers may consist of a predefined or signaled primary DL carrier, or a set of DL carriers.

Referring again to FIGS. 5A and 5B, the procedure 500 further includes combining out-of-synch indications from each of the carriers in the set of monitored DL carriers into combined out-of-synch indications (510), and combining in-synch indications from each of the carriers in the set of monitored DL carriers into combined in-synch indications (515). The procedure 500 further includes counting the number of combined out-of-synch indications (520) using a first counter $330_1$ (e.g., N310), and initiating a recovery timer $325_1$ (e.g., T310) on a condition that a predefined number of combined out-of-synch indications was counted (525), as determined by the first counter $330_1$. The procedure (500) further includes counting the number of combined in-synch indications (530) using a second counter $330_2$, and determining whether a predefined number of combined in-synch indications was counted before the recovery timer $325_1$ expired (535). If the number of combined in-synch indications reaches the predefined number of combined in-synch indications, the recovery timer $325_1$ is stopped and reset, along with the first and second counters $330_1$ and $330_2$ (540). If the number of combined in-synch indications does not reach the predefined number of combined in-synch indications, a radio link failure is declared (545) and either a connection re-establishment procedure or an RRC connection release procedure is performed (550).

Radio link monitoring may be performed within a "scheduled set", as described above, of component carriers. The anchor carrier may correspond to a "primary carrier". This may be realized by having all carriers of the scheduled set controlled from the same PDCCH or from separate PDCCHs. Similarly, it is possible that acknowledgement (ACK)/negative acknowledgement (NACK) feedback and channel quality indicator (CQI)/precoding matrix indicator (PMI)/routing indicator (RI) reports pertaining to DL transmissions from the scheduled set of carriers are sent from a single "primary" UL carrier.

In one method, only the primary carrier is monitored while the recovery timer is not running. When a radio link problem is detected on the primary carrier (N310 out-of-synch indications), a recovery timer $325_1$ in the WTRU 100 (e.g., T310) is initiated (i.e., started) and radio link quality monitoring is immediately started on all DL carriers of the scheduled set, (i.e., on the SCCs), possibly only for the SCCs that are also PDCCH carriers. Thus, the physical layer now provides in-synch indications and out-of-synch indications for each of the DL carriers, (i.e., for the PCC and all of the SCC(s)). A non-DRX evaluation period may be used on all of the DL carriers regardless of whether DRX was used or not on the DL carriers. Thus, the WTRU 100 may receive continuously on the DL carriers.

The recovery timer $325_1$ (e.g., T310) may be stopped upon reception of a predefined number (e.g., N311) of consecutive in-synch indications from the same carrier (the value of the recovery timer $325_1$ may be carrier-dependent). If this carrier is different from the primary carrier, the WTRU 100 may initiate transmission of a report from which the network could initiate a procedure to re-establish the PCC or may perform a "primary re-establishment", as described further below.

The WTRU 100 may first start the evaluation period on the subset of DL carriers (within the scheduled set) it has been configured to actively receive, (i.e., PDCCH and/or PDSCH reception), and then in a second phase if consecutive in-synch indications have not been detected from any one carrier in this subset. The requirement to start with a carrier subset and alternate detection to other carriers may be based on WTRU capability.

If the recovery timer $325_1$ (e.g., T310) expires, the WTRU may initiate a recovery procedure such as a connection re-establishment procedure or an RRC connection release procedure (depending on whether security is activated or not) is performed as in the single carrier case. Alternatively, the occurrence of a partial radio link failure for this primary carrier (or for a "scheduled set" of carriers) may be considered, and appropriate actions may be taken as described below.

Figure 6:
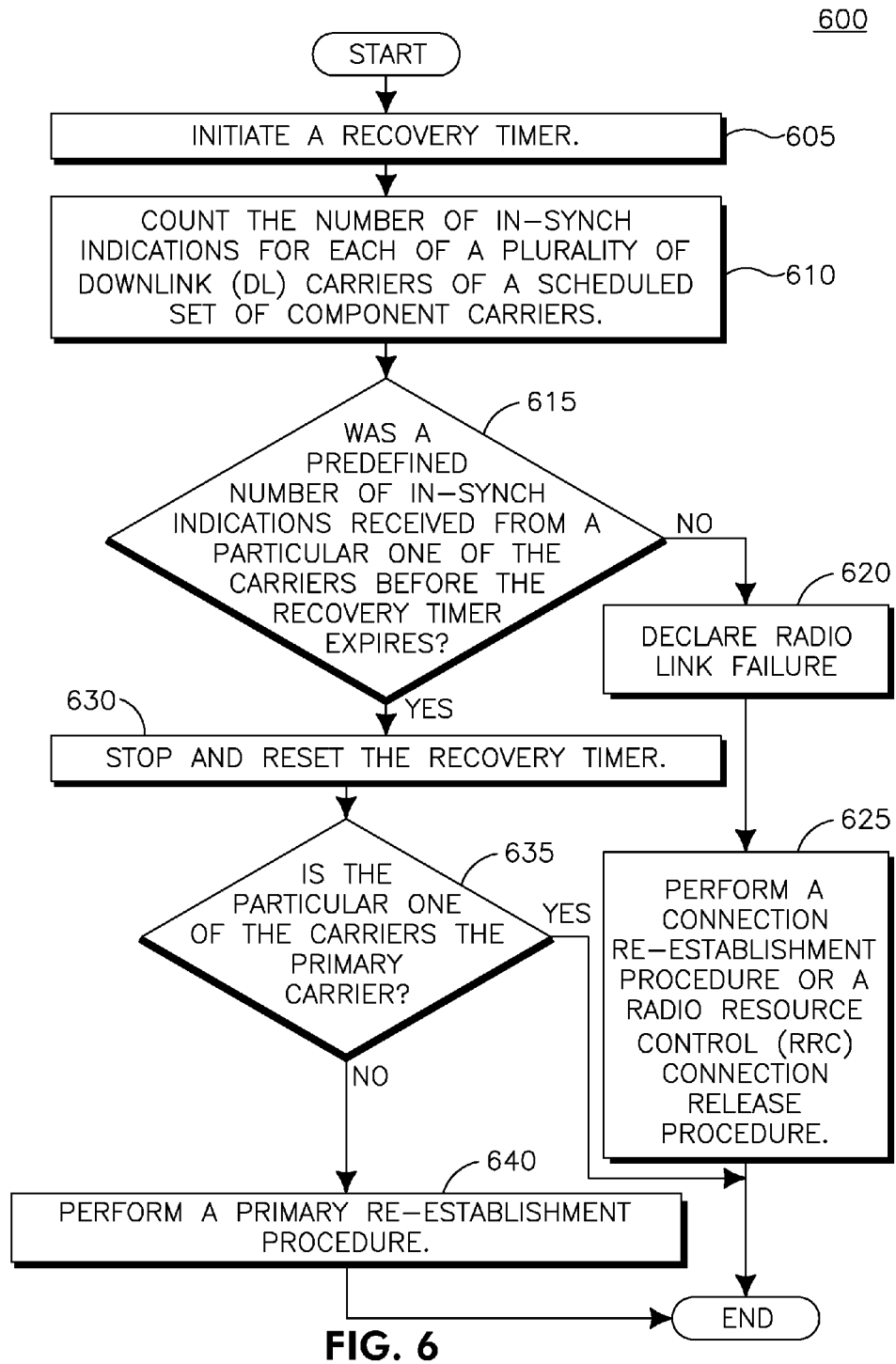

As shown in FIG. 6, a procedure 600 for monitoring radio links includes initiating a recovery timer (605), counting the number of in-synch indications for each of a plurality of DL carriers of a scheduled set of component carriers (610), and determining whether a predefined number of in-synch indications was received from a particular one of the carriers before the recovery timer expires (615). If a predefined number of in-synch indications was not received from a particular one of the carriers before the recovery timer expires, a radio link failure is declared (620), and either a connection re-establishment procedure or an RRC connection release procedure is performed (625). If a predefined number of in-synch indications was received from a particular one of the carriers before the recovery timer expires, the recovery timer is stopped and reset (630), and a determination is made as to whether the particular one of the carriers is the primary carrier (635). If the particular one of the carriers is determined not to be the primary carrier, a primary re-establishment procedure is performed (640).

In another method, a first recovery timer $325_1$ (e.g., T310) is initiated (i.e., started) upon reception of a predefined number (e.g., N310) of consecutive out-of-synch indications for one or more carriers of a first subset of DL carriers such as at least one of a PCC, an anchor carrier or a PDCCH carrier of a "scheduled set", and the first recovery timer $325_1$ is stopped upon reception of a first predefined number (e.g., N311) of consecutive in-synch indications for the carriers for which the first timer is applicable. If the first recovery timer $325_1$ expires (due to the first predefined number (e.g., N311) of consecutive in-synch indications not being received), a second recovery timer $325_2$ (e.g., T310bis) is initiated, and radio link quality monitoring is started on a different subset of the DL carriers such as all SCCs or all PDCCH carriers or all DL carriers of a "scheduled set". Thus, the physical layer now provides in-synch and out-of-synch indications for each carrier of the scheduled set. The value (e.g., T310bis) of the second recovery timer $325_2$ may or may not be the same as the value (e.g., T310) of the first recovery timer $325_1$. A non-DRX evaluation period may be used on all carriers regardless of whether DRX was used or not on these carriers. Thus, the WTRU 100 may receive continuously on these carriers.

The second recovery timer $325_2$ may be stopped upon reception of a second predefined number (e.g., N311bis) of consecutive in-synch indications from the same carrier (the second predefined number may be carrier-dependent). If this carrier is different from the primary carrier, the WTRU 100 may perform a "primary re-establishment" procedure as described below.

The WTRU 100 may first start the evaluation period on the subset of DL carriers (within the scheduled set) it has been configured to actively receive, and then in a second phase if consecutive in-synch indications have not been detected from any one carrier in this subset, alternate detection to other DL carriers in this cell. The requirement to start with a carrier subset and alternate detection to other carriers may be based on WTRU capability.

If the second recovery timer $325_2$ expires, either a connection re-establishment procedure or an RRC connection release procedure is performed (depending on whether security is activated or not) as in the single carrier case. Alternatively, the occurrence of a partial radio link failure for this primary carrier (or for this scheduled set of carriers) may be considered, and appropriate actions may be taken as described below.

Figure 7A:
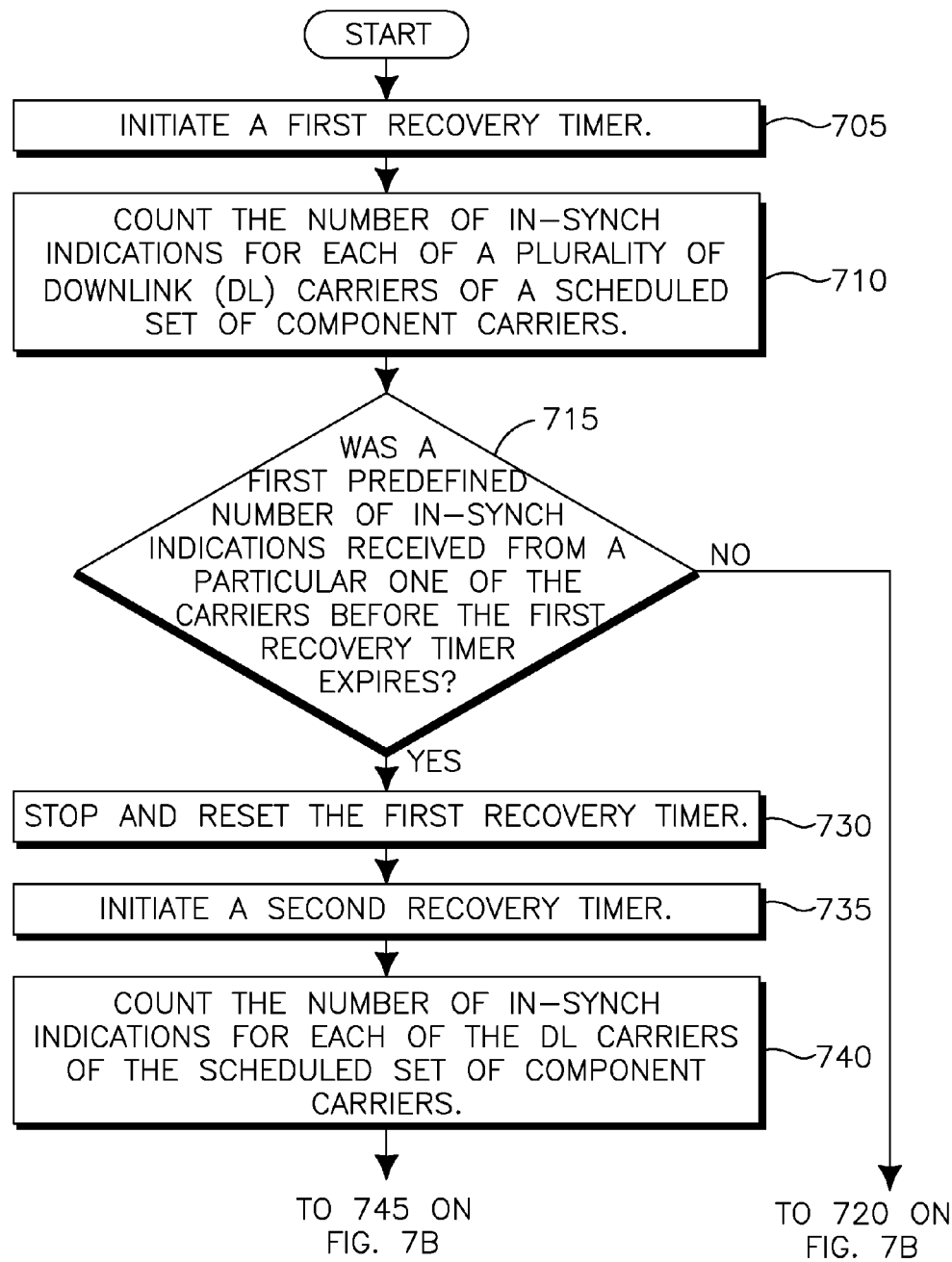
Figure 7B:
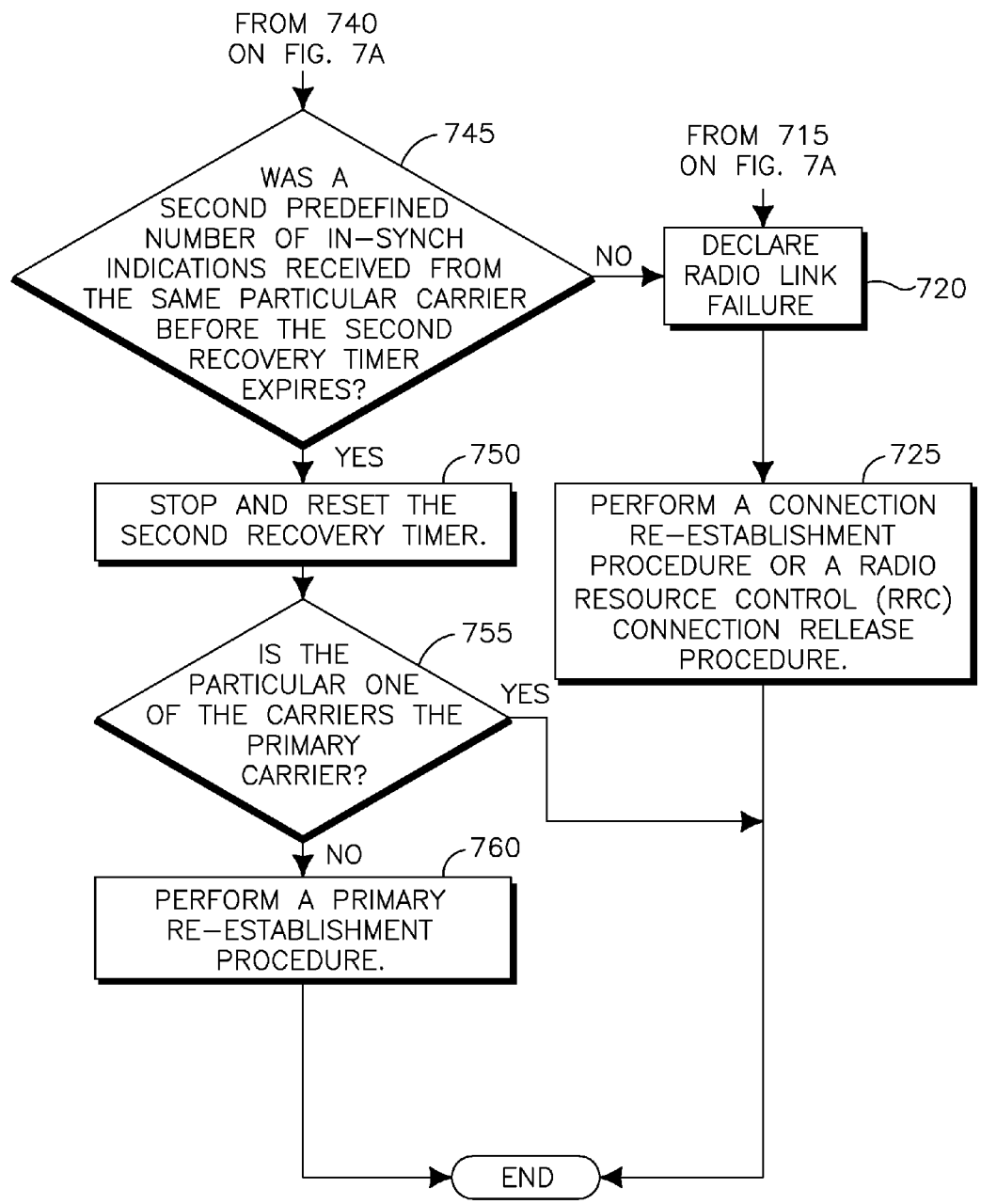

As shown in FIGS. 7A and 7B, a procedure 700 for monitoring radio links includes initiating a first recovery timer (705), counting the number of in-synch indications for each of a plurality of DL carriers of a scheduled set of component carriers (710), and determining whether a first predefined number of in-synch indications was received from a particular one of the carriers before the first recovery timer expires (715). If a first predefined number of in-synch indications was not received from a particular one of the carriers before the first recovery timer expires, a radio link failure is declared (720), and either a connection re-establishment procedure or an RRC connection release procedure is performed (725). If a first predefined number of in-synch indications was received from a particular one of the carriers before the first recovery timer expires, the first recovery timer is stopped and reset (730), a second recovery timer is initiated (735), the number of in-synch indications for each of a plurality of DL carriers of the scheduled set of component carriers is counted (740), and a determination is made as to whether a second predefined number of in-synch indications was received from the same particular one of the carriers before the second recovery timer expires (745). If a second predefined number of in-synch indications was not received from the particular one of the carriers before the second recovery timer expires, a radio link failure is declared (720), and either a connection re-establishment procedure or an RRC connection release procedure is performed (725). If a second predefined number of in-synch indications was received from a particular one of the carriers before the second recovery timer expires, the second recovery timer is stopped and reset (750), and a determination is made as to whether the particular one of the carriers is the primary carrier (755). If the particular one of the carriers is determined not to be the primary carrier, a primary re-establishment procedure is performed (760).

In another method, a first recovery timer $325_1$ (e.g., T310) is initiated (i.e., started), and a second recovery timer $325_2$ (e.g., T310bis) is also initiated. Radio link quality monitoring is immediately started on all DL carriers of the scheduled set. Thus, the physical layer now provides in-synch and out-of-synch indications for each carrier of the scheduled set. A non-DRX evaluation period may be used on all carriers regardless of whether DRX was used or not on these carriers. Thus, the WTRU 100 may receive continuously on these carriers.

The WTRU 100 may start an evaluation period on a subset of DL carriers (within the scheduled set) that the WTRU 100 has been configured to actively receive. If consecutive in-synch indications have not been detected from any one carrier in this subset, alternate detection to other DL carriers in this cell may be implemented, based on WTRU capability.

The first recovery timer $325_1$ is stopped upon reception of a predefined number (e.g., N311) of consecutive in-synch indications from the primary carrier.

The second recovery timer $325_2$ is stopped upon reception of a predefined number (e.g., N311) consecutive in-synch indications from the same primary or secondary carrier (the value of the predefined number may be carrier-dependent).

If the first recovery timer $325_1$ expires and the second recovery timer $325_2$ had previously been stopped due to the reception of a predefined number (e.g., N311) of consecutive in-synch indications, the WTRU 100 may perform a "primary re-establishment" procedure as described below.

If the first recovery timer $325_1$ expires and the second recovery timer $325_2$ had previously expired, (i.e., had not been stopped due to the reception of N311 consecutive in-synch indications), either a connection re-establishment procedure or an RRC connection release procedure is performed (depending on whether security is activated or not) as in the single carrier case. Alternatively, the occurrence of a partial radio link failure for this primary carrier (or for this scheduled set of carriers) may be considered, and appropriate actions may be taken as described below.

If the second recovery timer $325_2$ expires and the first recovery timer $325_1$ had previously expired, either a connection re-establishment procedure or an RRC connection release procedure is performed (depending on whether security is activated or not) as in the single carrier case. Alternatively, partial radio link failure may be considered to have occurred for the primary carrier (or for this scheduled set of carriers) and appropriate actions are taken as described below.

Figure 8:
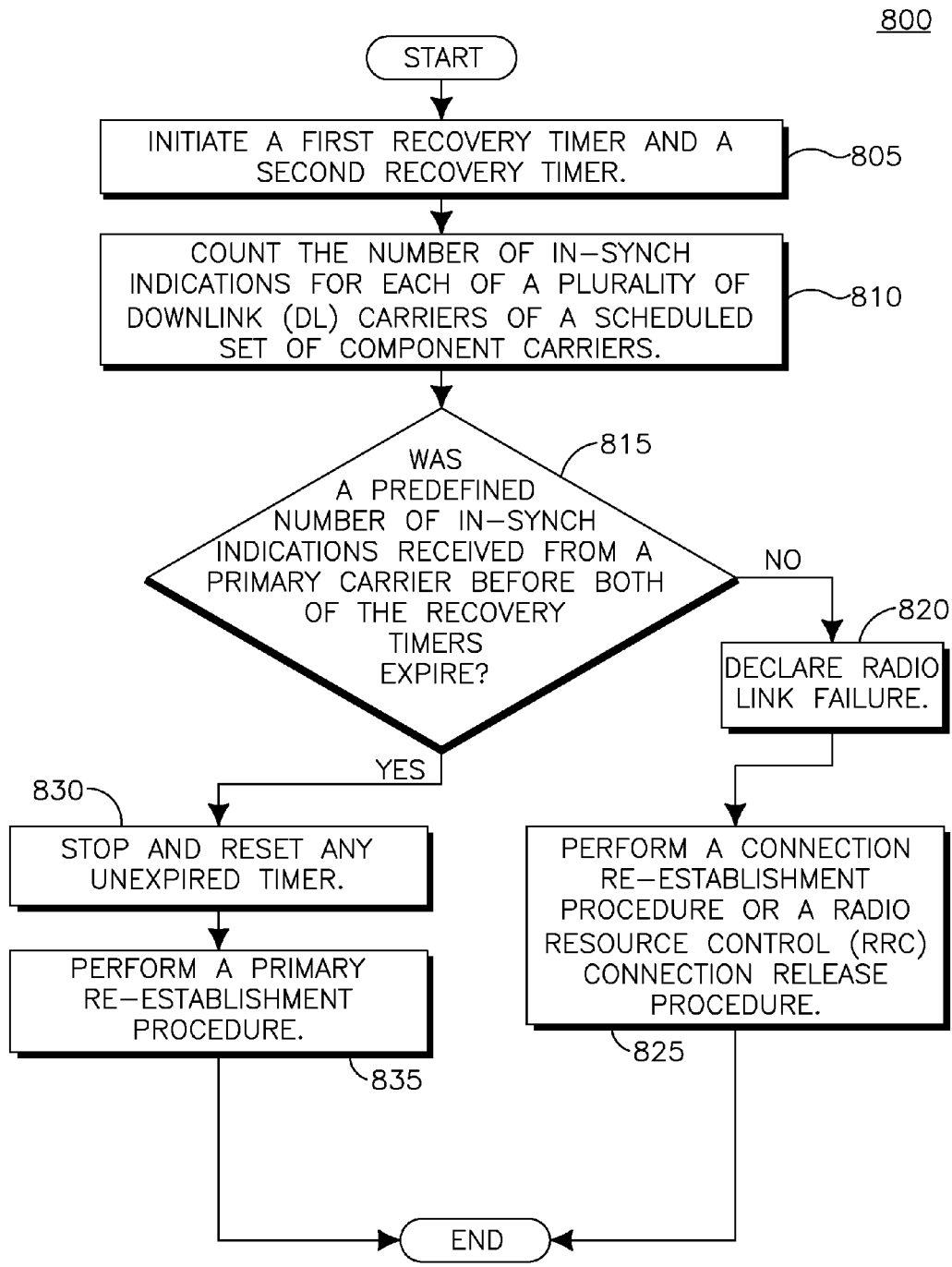

As shown in FIG. 8, a procedure 800 for monitoring radio links includes initiating a first recovery timer and a second recovery timer (805), counting the number of in-synch indications for each of a plurality of DL carriers of a scheduled set of component carriers (810), and determining whether a predefined number of in-synch indications was received from a primary carrier before both of the recovery timers expire (815). If a predefined number of in-synch indications was not received from a primary carrier before both of the recovery timers expire, a radio link failure is declared (820), and either a connection re-establishment procedure or an RRC connection release procedure is performed (825). If a predefined number of in-synch indications was received from a primary carrier before both of the recovery timers expire, any of the recovery timers that did not expire is stopped and reset (830), and a primary re-establishment procedure is performed (835).

In another method, all carriers of the scheduled set are monitored. A radio link monitoring procedure is executed separately and concurrently on each carrier of the scheduled set. Thus, for each carrier, the physical layer indicates in-synch and out-of-synch to higher layers. For each carrier, the number of consecutive out-of-synch and in-synch indications is tracked separately. The WTRU 100 detects a "radio link problem" for a specific carrier when a predefined number (N310) of consecutive out-of-synch indications are received for this carrier. The WTRU 100 starts a recovery timer $325_1$ (e.g., T310) specific for this carrier. This recovery timer $325_1$ is stopped if the predefined number (N311) of consecutive in-synch indications is received for the carrier. The values of the timers 325 and the predefined number of in-synch indications may be carrier-dependent. Once the recovery timer $325_1$ expires for a carrier, the behavior may be as follows depending on the type of carrier, (e.g., whether the DL CC is a PCC or a SCC).

If the carrier is a SCC, the WTRU may perform actions upon detection of "partial radio link failure" for this carrier without affecting operations on other carriers (PCC or not).

If the carrier is a PCC, the WTRU 100 may perform one or a combination of:

1) a primary re-establishment procedure as described below, where the new PCC is one of the carriers for which the recovery timer $325_1$ is not running (if any—otherwise this option is not available);

2) actions upon detection of "partial radio link failure" for all carriers of the scheduled set for this carrier (e.g., possibly a PCC which is also an anchor carrier). This may be performed if the recovery timer $325_1$ is running on all carriers of the scheduled set.

The evaluation period for in-synch and out-of-synch indications on a given carrier depends on the DRX activity of this carrier, if DRX is on a per-carrier basis. Optionally, the evaluation periods for in-synch/out-of-synch indications are specific to each carrier (depending on the DRX) as long as no recovery timer 325 is running for any carrier. When a recovery timer 325 is running for any carrier, the evaluation period (for all carriers or for a certain subset of carriers signaled by higher layers) for in-synch/out-of-synch indications correspond to that of continuous reception (non-DRX) or reception with a higher duty rate. Such monitoring increases the chances of detecting radio link problem rapidly on other carriers and thus may potentially minimize the loss of data or connection, considering that radio link problems are susceptible to be correlated between carriers. Optionally, the values of the recovery timers 325 and the predefined umber of in-synch indications for a given carrier may be modified when the recovery timer 325 is running for any carrier (or any carrier from a certain subset of carriers signaled by higher layers).

Another possible scenario is that UL/DL scheduling for a carrier is signaled over the same carrier. This may, for instance, be realized by having the WTRU 100 monitor a PDCCH for each carrier it is assigned to. It is also possible to have a more general scenario where multiple anchor carriers exist with their corresponding scheduled sets of carriers. The former scenario may be considered as a particular case of the latter where the scheduled set of an anchor carrier consists of this anchor carrier. Thus, the solutions described in this section will be described in terms of the more general scenario with multiple PDCCH carriers. One of the PDCCH carriers may correspond to a "primary" carrier which is monitored for the purpose of radio link failure detection as previously described.

In this scenario, all active PDCCH carriers the WTRU 100 is configured to receive in the cell are monitored, even when the recovery timer is not running. DRX reception on active carriers may be applied on a per-carrier basis. Thus, if the WTRU 100 is monitoring the PDCCH on (or for) a given carrier at a given sub-frame, this does not imply that it is monitoring the PDCCH on other carrier(s). Alternatively, DRX reception may be applied jointly on all active carriers.

In one method, the radio link monitoring procedure is executed separately and concurrently on each PDCCH carrier. Thus, for each PDCCH carrier, the physical layer indicates in-synch and out-of-synch to higher layers. For each PDCCH carrier, the number of consecutive out-of-synch and in-synch indications is tracked separately. The WTRU 100 detects a "radio link problem" for a specific carrier when a first predefined number (e.g., N310) of consecutive out-of-synch indications are received for this carrier. The WTRU 100 starts a recovery timer 325 (e.g., T310) specific for this PDCCH carrier. This recovery timer 325 is stopped if a second predefined number (e.g., N311) of consecutive in-synch indications are received for the carrier. The values of the recovery timer 325 and the predefined number of consecutive in-synch indications may be carrier-dependent. If the recovery timer 325 expires, a radio link failure is declared for the concerned PDCCH carrier. Such an event may be referred to as a "partial radio link failure." Upon partial radio link failure, the WTRU 100 may take actions as described below to notify the network and potentially remove or recover the carrier. If all of the PDCCH carriers (possibly only for a PDCCH that is also a PCC and/or an anchor carrier) the WTRU 100 was configured to receive in the cell have detected a radio link failure condition, the WTRU 100 may take actions as for the currently defined radio link failure procedure for single carrier, i.e., initiate the re-establishment procedure or release the RRC connection.

The evaluation period for in-synch and out-of-synch indications on a given PDCCH carrier depends on the DRX activity of this carrier, if DRX is on a per-carrier basis. Optionally, the evaluation periods for in-synch/out-of-synch indications are specific to each PDCCH carrier (depending on the DRX) as long as no recovery timer 325 is running for any PDCCH carrier (possibly only for a PDCCH that is also a PCC and/or an anchor carrier). When the recovery timer 325 (e.g., T310) is running for any PDCCH carrier (possibly only for a PDCCH that is also a PCC and/or an anchor carrier), the evaluation period (for all PDCCH carriers or for a certain subset of primary carriers signaled by higher layers) for in-synch/out-of-synch indications correspond to that of continuous reception (non-DRX) or reception with a higher duty rate. Such monitoring increases the chances of detecting a radio link problem rapidly on other primary carriers, and thus may potentially minimize the loss of data or connection, considering that radio link problems are susceptible to be correlated between carriers. Optionally, the values of the recovery timer 325 and the predefined number of consecutive in-synch indications (e.g., N310, T310, and N311) for a given carrier may be modified when the recovery timer 325 (e.g., T310) is running for any carrier (or any carrier from a certain subset of carriers signaled by higher layers).

In another method, a radio link monitoring procedure is executed separately and concurrently on each scheduled set of component carriers as per one of the methods described above. The detection of a radio link problem on any of the PDCCH carriers (possibly only for a PDCCH that is also a PCC and/or an anchor carrier) may result in either in a primary re-establishment or in a partial radio link failure. The values of recovery timers 325 and the predefined number of consecutive in-synch indications, (e.g., N310, N311, T310, and (if applicable) T310bis), may be dependent on the scheduled set.

Upon partial radio link failure on one PDCCH carrier (possibly only for a PDCCH that is also a PCC and/or an anchor carrier), the WTRU 100 may take actions to notify the network and potentially remove or recover the PDCCH carrier and/or the entire scheduled set of carriers for this anchor PDCCH, if applicable. If all of the PDCCH carriers (possibly only for a PDCCH that is also a PCC and/or an anchor carrier) the WTRU 100 was configured to receive in the cell have detected a radio link failure condition, the WTRU 100 may take actions as for the currently defined radio link failure procedure for a single carrier, (i.e., initiate the re-establishment procedure or release the RRC connection).

The evaluation period for in-synch and out-of-synch indications on a given PDCCH carrier depends on the DRX activity of this carrier, if DRX is on a per-carrier basis. Optionally, the evaluation periods for in-synch/out-of-synch indications are specific to each PDCCH carrier (depending on the DRX) as long as no recovery timer 325 is running for any PDCCH carrier (possibly only for a PDCCH that is also a PCC and/or an anchor carrier). When a recovery timer is running for any PDCCH carrier (possibly only for a PDCCH that is also a PCC and/or an anchor carrier), the evaluation period (for all PDCCH carriers or for a certain subset of PDCCH carriers signaled by higher layers) for in-synch/out-of-synch indications correspond to that of continuous reception (non-DRX) or reception with a higher duty rate. Such monitoring increases the chances of detecting a radio link problem rapidly on other PDCCH carriers, and thus may potentially minimize the loss of data or connection, considering that radio link problems are susceptible to be correlated between carriers. Optionally, the values of the recovery timers 325 and the predefined number of consecutive in-synch indications, (e.g., N310, N311, T310, and (if applicable) T310bis), for a given carrier may be modified when the recovery timer 325 is running for any PDCCH carrier (or any carrier from a certain subset of carriers signaled by higher layers).

Actions Upon Detection of Partial or Full Radio Link Failure

The procedures described below may apply to detection of "partial radio link failure" of a downlink carrier configured with PDCCH. They may also apply to the detection of failure of a downlink carrier configured with PDSCH, but not PDCCH.

Optionally, in case one of the carriers WTRU is configured to operate with has a specific role (e.g., a PPC, anchor carrier or the DL carrier corresponding to the "special cell" or the "serving cell"), the procedures below may apply in case this carrier fails.

Upon partial radio link failure detection (a subset of the DL active carriers detect radio link failure), either an explicit notification may be signaled to the eNB or it may be left for the eNB to implicitly detect the partial radio link failure.

The explicit indication may be signaled by a physical uplink control channel (PUCCH), MAC control element (CE), or RRC measurement report. The PUCCH may indicate a very low CQI report or a unique CQI code point. The MAC CE and RRC measurement report may require a DL carrier identifier is indicated. A new measurement event may be defined to trigger transmission of an RRC measurement report upon occurrence of partial radio link failure for a carrier.

The WTRU 100 may stop UL transmissions, disabling the UL carrier that is paired with the failed DL carrier. The pairing with a DL carrier is either pairing for hybrid automatic repeat request (HARQ) feedback or pairing for PDCCH scheduling. The UL carrier may be disabled for scheduling if all DL carriers that may provide scheduling for this UL carrier have failed.

The WTRU 100 may stop UL transmissions and release resources on any UL carrier whose timing advance is adjusted with respect to the DL carrier having experienced partial radio link failure. Optionally, this may occur when there is no other DL carrier without a radio link problem to which the same timing advance may be applied. If there is at least one such DL carrier, the WTRU 100 may continue UL transmissions and adjust the timing advance with respect to this DL carrier.

Furthermore, the WTRU 100 may take the same actions as if a timing advance timer expired for any UL carrier whose timing advance is adjusted with respect to the DL carrier having experienced partial radio link failure.

The implicit eNB detection may be based on UL discontinuous transmission (DTX) detection for PUCCH or HARQ feedback corresponding to the DL carrier.

When a partial radio link failure is detected, a partial MAC reset may be applied for the concerned DL carrier and the HARQ processes associated with this DL carrier are flushed. In addition, the same applies to any UL carrier for which transmissions are stopped and resources are released as per one of the above scenarios.

When the WTRU 100 detects a partial radio link failure, it may indicate the cell identity (ID) or carrier ID, (corresponding to the carrier on which the radio link failure occurred), to the network along with the list of other cells it is camped on, (if the different carriers come from different cells in the network). Alternatively, in case of a partial radio link failure, the WTRU 100 may indicate the cell ID or carrier ID of the last PCC along with the cell ID or carrier ID of the new PCC.

It is possible that one of the carriers (or one of the PDCCH carriers) has a special role (e.g., a PPC, anchor carrier or the DL carrier corresponding to the "special cell" or the "serving cell") with respect to the assignment of certain security parameters. If that partial radio link failure has occurred for the "serving cell," the WTRU 100 autonomously selects a new "serving cell" among one of the remaining carriers and notifies this choice to the network. Alternatively, the WTRU may report that partial radio link failure has occurred for the serving cell, and may perform the re-assignment based on an indication from the network. Upon re-assignment of the serving cell, the WTRU 100 may act as if a change of security parameters has occurred, which may involve re-establishment of packet data convergence protocol (PDCP) entities.

Primary Re-Establishment Procedures

A primary re-establishment procedure may be triggered once the WTRU has detected a radio link failure on the DL primary carrier and monitoring of the other non-primary carriers indicates that one or more carriers are acceptable, whereby in-synch indications for one or more non-primary carriers were sent to higher layers. The procedure may be applied only to the a PCC as previously defined. Alternatively, the procedure may be applied to any "PDCCH carrier". The primary re-establishment procedure may be limited to the subset of DL carriers within the cell that the WTRU 100 has been configured to actively receive.

Figure 9:
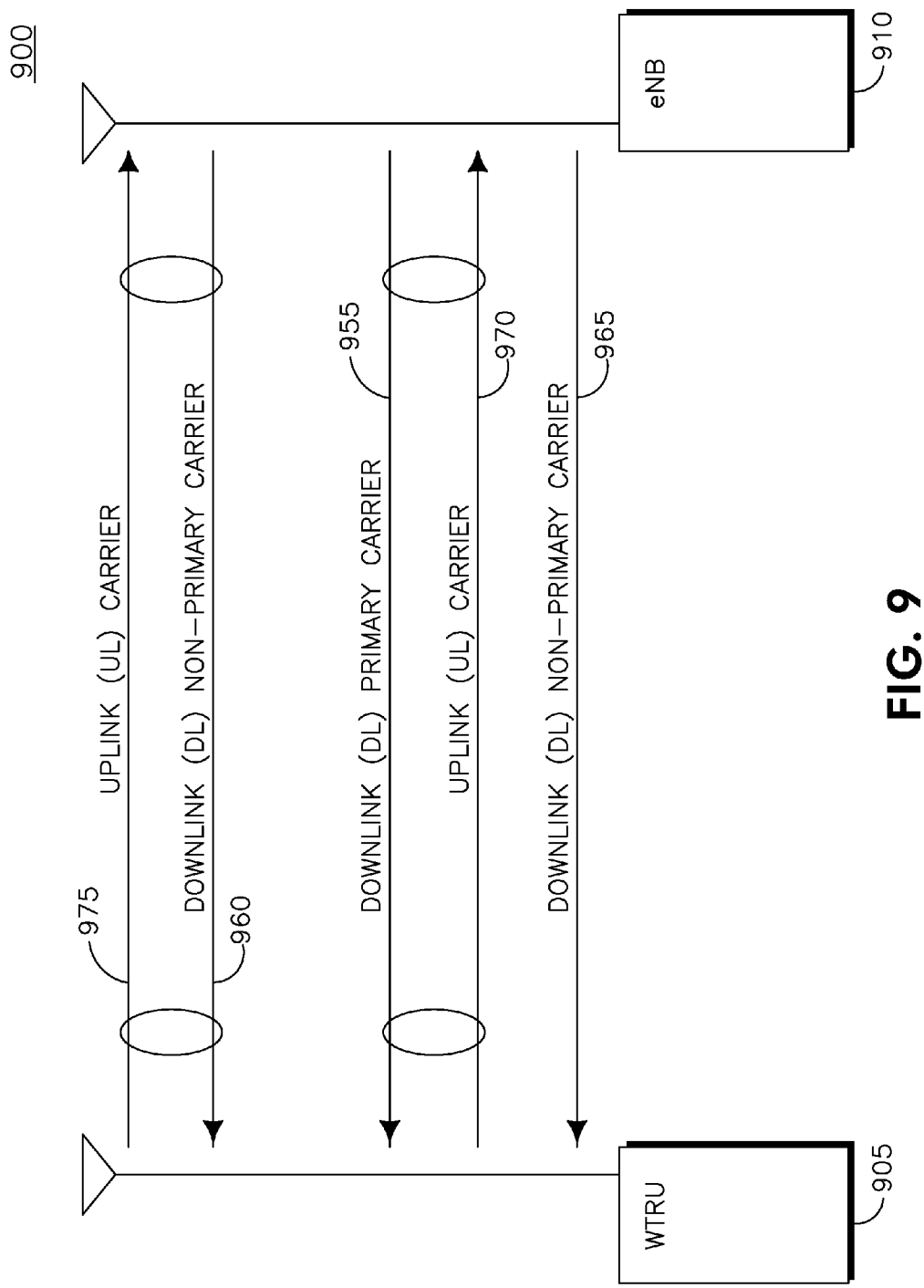
FIGS. 9 and 10 shows how DL and UL carriers are configured to perform an RRC primary carrier re-establishment procedure.

As shown in FIG. 9, an RRC primary carrier re-establishment procedure may be implemented to request a network 900, including a WTRU 905 and an eNB 910, to change the DL primary carrier. In an initial state, a DL primary carrier 955 is in a radio link failure condition, DL non-primary carriers 960 and 965 have in-synch indications, UL carrier 970 is paired with the DL primary carrier 955, and UL carrier 975 is paired with the DL non-primary carrier 960.

Once the WTRU 905 switches to a new carrier, the WTRU 905 may implicitly designate one of the carriers as the new primary carrier, (e.g., based on signal strength or signal quality). The same set of system parameters, (e.g., random access channel (RACH), access class barring, or any other suitable parameter), may be applied to the new primary carrier that the WTRU 905 used on the previous primary carrier, since the network 900 may preserve the WTRU context for a limited duration after a radio link failure procedure occurs. Once the WTRU 905 switches to the new primary carrier, the WTRU 905 may implicitly use the information acquired from the old primary carrier. Alternatively, the WTRU 905 may read selected system information blocks (SIBs) when it accesses the new primary carrier and then proceed to read the RACH. Alternatively, the network 900 may signal whether the network 900 should continue to use the parameters from the current primary carrier when it switches its primary carrier through a one bit field.

The WTRU 905 may send a scheduling request (SR) on the PUCCH of the UL carrier 975 paired with a DL non-primary carrier 960 having an in-synch indication. Alternatively, if necessary, a RACH procedure may be applied to generate the SR. The RACH procedure may not be required if another primary carrier exists in the cell for which there is no radio link problem and for which the same timing advance is applicable.

The WTRU 905 then starts searching through WTRU-specific search space of the DL non-primary carrier 960 for PDCCH candidates based on similar rules as LTE release 8 (R8). A PDCCH candidate matches the cell radio network temporary identifier (C-RNTI) of the WTRU 905 for a downlink control information (DCI) format 0 containing an UL grant for UL-shared channel (SCH) in UL carrier 975.

The WTRU 905 sends an RRC message requesting the network to change the DL primary carrier 955 to DL carrier 960 on the UL-SCH in UL carrier 975.

The hybrid automatic repeat request (HARQ) buffers are left intact during the entire procedure.

Once the WTRU 905 switches to the new carrier, the WTRU 905 may continue to monitor the previous primary carrier on which the radio link failure occurred and report it to the network if a predefined number of in-synch indications occurred or if the signal strength on the previous primary carrier was above a particular threshold. This may be useful if the network had designated the primary carrier on which the WTRU was camped as the "preferred" component carrier for the WTRU.

In case no PDCCH are received after a predefined number of subframes, another SR is sent over the UL carrier 975.

If a predefined number of SRs are sent over UL carrier 975 without receiving the PDCCH with DCI format 0, the SR may be sent over another UL carrier paired with a DL non-primary carrier with the in-synch indicator (in this case, the SR may be sent on UL carrier 970. If no PDCCH with DCI format 0 may be received from any DL non-primary carrier, the procedure fails and the WTRU 905 may perform the existing RRC re-establishment procedure.

Once the DL primary carrier change is completed, the network 1000 may change the UL primary carrier or this may be performed implicitly based on which UL carrier is paired with the new DL primary carrier.

Asymmetrical Cases

To handle asymmetrical cases such as one UL carrier and N DL carriers, specific PUCCH resources (different cyclic shifts) may be identified by higher layers to indicate that assignment of a certain scheduling request should be received on different DL carriers. For example, UL assignments for a scheduling request sent using PUCCHx and PUCCHy are received on the DL primary carrier, but assignments in response to SRs sent over PUCCHz and PUCCHz+1 are received over DL carrier n and DL carrier n+1, respectively.

Figure 10:
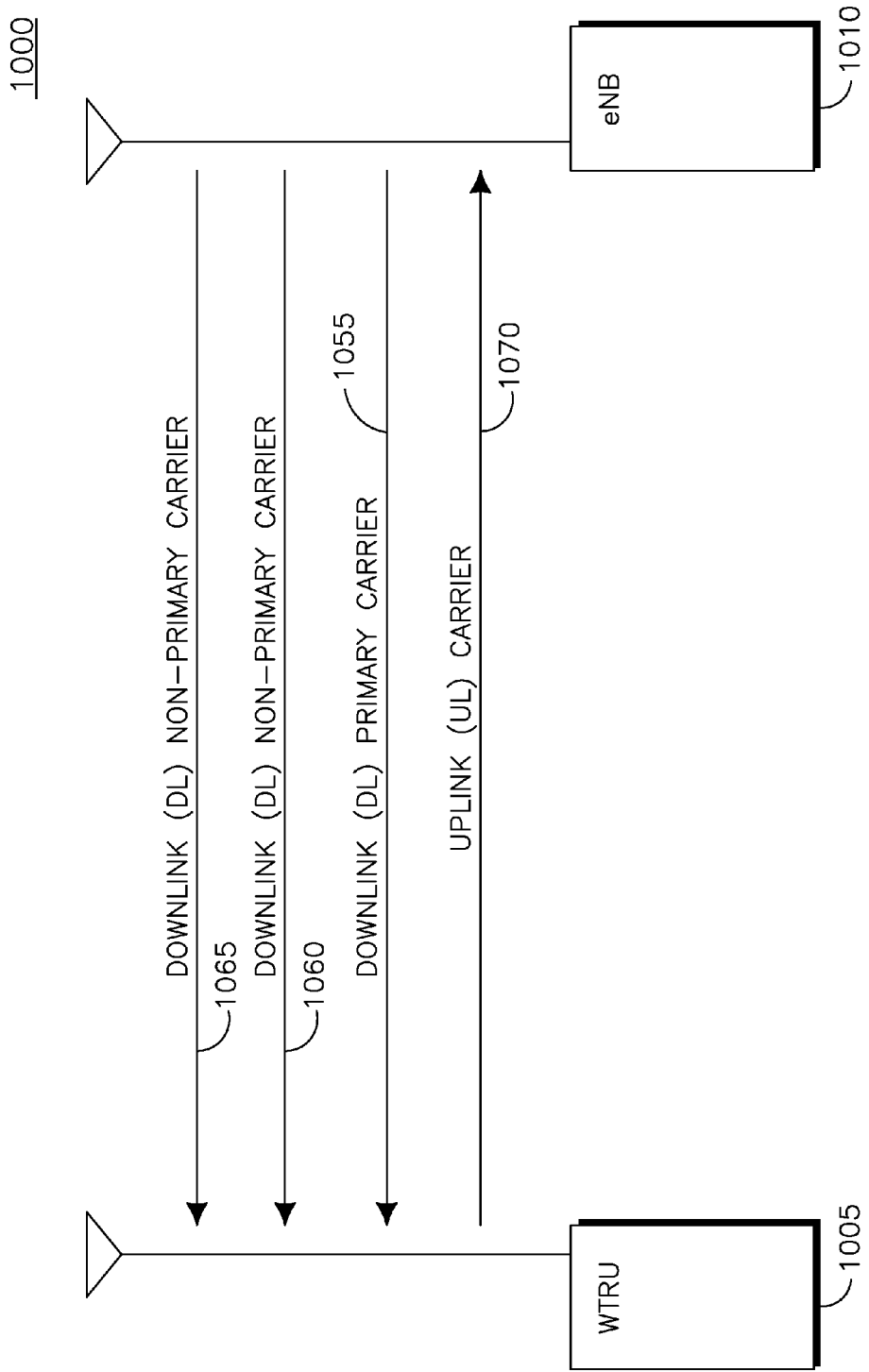

Alternatively, another new type of scheduling request may be used in LTE-A which explicitly indicates that the assignment should not be received on the primary carrier. As shown in FIG. 10, an RRC primary carrier re-establishment procedure may be implemented to request a network 1000, including a WTRU 1005 and an eNB 1010, to change the DL primary carrier. In an initial state, a DL primary carrier 1055 is in a radio link failure condition, DL non-primary carriers 1060 and 1065 have in-synch indications, and an UL carrier 1070 is established.

Once the WTRU 1005 switches to a new carrier, the WTRU 1005 may implicitly designate one of the carriers as the new primary carrier, (e.g., based on signal strength). The same set of system parameters, (e.g., RACH, access class barring, or any other suitable parameter), may be applied to the new primary carrier that the WTRU 1005 used on the previous primary carrier, since the network 1000 may preserve the WTRU context for a limited duration after a radio link failure procedure occurs. Once the WTRU 1005 switches to the new primary carrier, the WTRU 1005 may implicitly use the information acquired from the old primary carrier. Alternatively, the WTRU 1005 may read selected system information blocks (SIBs) when it accesses the new primary carrier, and then proceed to read the RACH. Alternatively, the network 1000 may signal whether the network 1000 should continue to use the parameters from the current primary carrier when it switches its primary carrier through a one bit field.

The WTRU 1005 sends a new type of SR on the PUCCH of the UL carrier 1070 which contains another bit to indicate that the assignment should not be received on the DL primary carrier 1055. Alternatively, if necessary, a physical random access channel (PRACH) procedure may be applied to generate the SR.

The WTRU 1005 starts searching through WTRU-specific search space of all DL non-primary carriers 1060 and 1065 with an in-synch indication for PDCCH candidates based on similar rules as LTE R8. A PDCCH candidate matches the C-RNTI of the WTRU 1005 for a DCI format 0 containing a UL grant for UL-SCH in the UL carrier 1070.

The WTRU 1005 sends an RRC message requesting the network to change the DL primary carrier 1055 to the DL carrier 1060 over the UL-SCH of the UL carrier 1070.

The HARQ buffers are left intact during the entire procedure.

Another method may be based on a new MAC CE command signifying a DL primary carrier change. The MAC CE command may explicitly identify the new DL primary carrier. Referring again to FIG. 10, the WTRU 1005 may select DL non-primary carrier 1060 or DL non-primary carrier 1065 based on the best signal strength, or identify the DL carrier for which the consecutive in-synch indications were first detected. However, instead of sending an RCC message, a MAC CE command may be sent. In this case, confirmation may be signaled by a MAC CE rather than implicit confirmation based on PDCCH reception.

The RRC primary re-establishment procedure may be part of a larger intra-cell handover procedure. Configurations applying to the source DL and possibly UL primary carriers, such as DRX cycles, semi-persistent scheduling (SPS), PUCCH/PDCCH and HARQ entity/processes may be transferred to the new target primary carrier upon establishment. Compared with inter-cell handovers, it may be possible to avoid RLC and PDCP reestablishment, although MAC reset flushing the HARQ buffers is a likely consequence.

Once the WTRU 1005 switches to the new carrier, the WTRU 1005 may continue to monitor the previous primary carrier on which the radio link failure occurred and report it to the network if a predefined number of in-synch indications occurred or if the signal strength on the previous primary carrier was above a particular threshold. This may be useful if the network 1000 had designated the primary carrier on which the WTRU 1005 was camped as the "preferred" component carrier for the WTRU 1005.

Recovery Procedures

The WTRU 1005 may autonomously consider the carrier for which partial radio link failure has occurred as "de-activated," and may remove it from its connection configuration state in RRC. Alternatively, the WTRU 1005 may perform these actions upon explicit notification from the network 1000. In the latter case, the WTRU 1005 may consider the carrier as in a "dormant" state and perform special monitoring and recovery actions such as described below.

In case a radio link failure is detected on all carriers on the network, the WTRU may either signal the cell IDs or carrier IDs corresponding to all the component carriers or the cell ID or carrier ID corresponding to the primary component carrier to the network.

For each detected downlink radio link failure carrier, the carrier identifier (numbered within the cell) or the radio frequency channel number (e.g., E-UTRA absolute radio frequency channel number (EARFCN)), broadcast in the LTE-A cell's system information or indicated in the dedicated carrier assignment message, is signaled to the LTE-A eNB or the network in a RRC message such as the RRC connection re-establishment message or other RRC level messages to facilitate the LTE-A eNB for starting recovery actions such as reassigning the data path or control path to one or more other downlink carriers, new or existing to the concerned WTRU within the LTE-A cell.

A radio link failure cause may also need to be indicated to the eNB or the network just to distinguish whether the root of the problem is from a detected out-of-synch, an RLC unrecoverable error, PDCP integrity problem or other related problems.

In the same case, the WTRU also may indicate the signal strength and/or the signal quality of the already actively receiving DL carriers, and optionally of some other DL carriers that have been monitored for the event, to facilitate the eNB carrier reassignment decision or a handover decision. If the detected radio link failure carriers include a PDCCH carrier, the WTRU may need to include the measurement results of another PDCCH carrier if the LTE-A cell is configured with more than one PDCCH carrier in the cell.

When signaling the detected radio link failure carriers in a RRC message, the affected data plane protocol data unit (PDU) sequence number in the PDCP and/or RLC level, send and receive, also may be included with their respective HARQ-process identities, transport block sizes and their transport channel or logical channel numbers, and other relevant channel configuration parameters. However, in the affected data plane, the status PDUs in either the PDCP or RLC level may also be generated and transmitted to the eNB if still possible for preparing data recovery actions. If the detected radio link failure carrier carries control plane bearers, the related RRC, PDCP, or RLC sequence number may need to be signaled.

The WTRU may continue to send and receive over other unaffected carriers, UL and DL, while holding off the transmission or reception of the affected radio link failure carrier UL and DL or DL until a new assignment of the affected data path channel(s) is received from the eNB.

The WTRU starts a timer 325 once it has sent out the RRC message about the full or partial radio link failure detection/re-establishment request. If at the expiration of the timer 325, the WTRU has not received an eNB or network message responding to the radio link failure detection/reestablishment request message, the WTRU may resend the same message again. This resending may be repeated a predefined number of times, and after that the WTRU will release all its radio resources and goes to Idle mode.

When a partial radio link failure is detected, the WTRU may perform one or a combination of the following actions to ensure that it may receive subsequent signaling from the network from other non-failed carriers. The WTRU may activate or reactivate one or a plurality of carriers that had been configured but de-activated or, were in a dormant state, if such state is defined. The WTRU may continuously listen to the PDCCH of other carriers configured with PDCCH reception. Every sub-frame is part of the active time for these carriers, until a stopping condition occurs. Alternatively, the WTRU may suspend its normal DRX behavior on these carriers. Optionally, this applies to certain carriers configured for this behavior by the network, or carriers that have periodic on durations with a period above a threshold, in case DRX is configured on a per-carrier basis, or, that do not have any periodic on duration.

The stopping condition(s) may correspond to one or a subset of the following events: reception of a reconfiguration message from the network, reception of MAC PDU from the network from any control channel (CC), recovery of the carrier for which partial radio link failure had occurred, and detection of full radio link failure.

The network, knowing that the WTRU applies the following behavior, knows, upon detection of partial radio link failure, that it may transmit subsequent signaling on these carriers regardless of activation status or DRX state on these carriers.

Optionally, the activation and/or DRX suspension described above is applied when there is no other carrier configured with PDCCH that has not failed and that does not satisfy one or a combination of the following criteria: the carrier is activated or is in an active state, in case an "active/non-active" state exists, or the carrier is configured with periodic on durations, with the possible additional condition that the period is below a threshold.

The network may provide a UL grant on one of the DL active carriers for which there is no radio problem or partial radio link failure condition and the WTRU may initiate a RACH procedure utilizing the RACH configuration broadcast from one of the DL carriers for which there is no radio problem. This may allow the network to identify that the DL carrier (or one of the DL carriers) that has advertised the RACH resource which the WTRU used for its random access procedure is still in good radio condition, and thus that any UL grant should be transmitted from this (or one of these) DL carriers.

Alternatively, this RACH procedure may be initiated when a specific DL carrier (e.g., "special cell") has failed. The WTRU may require that the RACH procedure is initiated using the RACH configuration broadcast from this specific carrier (or "special cell"), unless a radio problem is detected on this carrier. Thus, the network understands that a radio problem has occurred on the "special cell" based on the WTRU initiating a RACH procedure using resources (UL carrier and preamble) not broadcast from the special cell. Based on this information, the network may take action to replace the special cell, such as initiating an RRC reconfiguration with or without mobility.

If one of the carriers the WTRU is configured to operate with a specific role (e.g., a PPC, anchor carrier or the DL carrier corresponding to the "special cell" or the "serving cell"), it is possible that specific actions need to be taken in case this carrier fails. The procedures described below apply for instance if either (a) the radio link monitoring is performed on a per-carrier basis (as described above) and the carrier or one of the carriers that failed corresponds to the special cell (while there is still at least one carrier that has not failed), or (b) radio link monitoring is performed for this special cell or PCC, and radio link failure is declared, but the signal quality from other carriers the WTRU is configured with is still acceptable.

In one method, the WTRU initiates the RRC connection re-establishment procedure (assuming security was activated) upon failure of the special cell or PCC. However, the procedure is modified. For instance, the following modifications may occur:

1) Instead of performing normal cell selection procedure, the WTRU selects a cell corresponding to one of the carriers it is configured with for which a radio problem does not exist. The WTRU may pick this carrier according to pre-determined or pre-signaled priority, or according to signal quality, or by prioritizing a DL carrier paired to an UL carrier on which PUCCH resources exist, or randomly. The selected cell may be seen as the "recommended" new special cell (or PCC) by the WTRU. In case all carriers the WTRU is configured with have failed, the WTRU may revert to the cell selection.

2) The WTRU may transmit the RRC connection re-establishment message by initiating a RACH procedure using resources broadcast by the selected cell (as described above). Optionally, this is performed if no PUCCH resource exists on the paired UL carrier.

3) The WTRU may transmit the RRC connection re-establishment message by first directly sending a scheduling request on any available PUCCH, (i.e., without performing the random access procedure), or on a PUCCH allocated on an UL carrier paired to a DL carrier that does not have a radio problem.

4) PDCP, RLC and/or MAC sub-layers may not be re-established or reset.

5) Security keys may not be modified.

6) The WTRU may include information about the signal quality or signal strength of one or a subset of DL carriers. Optionally, the information may be reported for the DL carrier corresponding to the cell that the WTRU has selected. Such cell may normally be reconfigured by the network as being the new "special cell."

In another method, the WTRU does not initiate the RRC connection re-establishment procedure upon detection of failure of the "special cell." The WTRU instead performs one or a combination of the following actions:

1) Initiate random access procedure utilizing RACH resources broadcast by a DL carrier that has not failed (as described herein). The DL carrier from which the WTRU picks the RACH resource (UL carrier, preamble) may be considered as corresponding to the "recommended" new special cell by the WTRU. Following this procedure the network may proceed with an RRC reconfiguration (with or without mobility) modifying the special cell, typically corresponding to the WTRU recommendation. Optionally, this is performed if no PUCCH resource is assigned to the UE, or if no PUCCH resource is assigned to the WTRU on an UL carrier paired to a DL carrier which has not failed.

2) Any combination of the actions described above. Following these actions the network may proceed with an RRC reconfiguration (with or without mobility) modifying the special cell.

After partial radio link failure has occurred for a carrier, the WTRU may use one or a combination of the following methods to facilitate eventual recovery of this carrier in case radio conditions improve.

In one method, after the radio link recovery timer 325 (e.g., T310) has expired, the WTRU keeps evaluating quality against the $Q_{in}$ and $Q_{out}$ thresholds and the physical layer correspondingly keeps sending in-synch and out-of-synch indications to higher layers, but the periodicity of these indications may be increased (as well as the measurement duration) compared to the periodicity prior to partial radio link failure to avoid unnecessarily consuming battery power. For example, the parameters for in-synch and out-of-synch indication measurement and reporting may revert to that corresponding to the DRX configuration for this carrier. Alternatively, the periodicity of in-synch or out-of-synch may revert to pre-defined values or values previously signaled by higher layers (broadcast or dedicated) which are possibly carrier-specific.

The WTRU may determine that recovery may be attempted for a failed carrier if the fraction of the most recent indications that are in-synch is above a threshold, or alternatively if some minimum number of consecutive in-synch indications is attained. These thresholds may also be pre-defined values or values previously signaled by higher layers. When this occurs, the WTRU may perform one or a combination of the following actions to request the network to re-initiate transmission on the failed carrier.

The WTRU may ensure that it has valid system information pertaining to the failed carrier. This may be achieved by comparing the current value tag of this system information to the value tag of the previously stored system information for this carrier. Alternatively, the WTRU may re-acquire the whole system information broadcast from this carrier.

The WTRU may transmit an RRC message to identify recovery of the carrier. Such a RRC message may be transmitted on any carrier or any carrier that has not failed. It may consist of a measurement report (in which case a new event could be defined to trigger this report). In this case, the WTRU may wait for the reception of a confirmation message from the network before considering that recovery has succeeded. The confirmation may be either an explicit RRC message or implicitly detected by a PDCCH command on the DL carrier with the identity of the WTRU. The confirmation message may contain a value tag of system information (pertaining to the failed carrier) to facilitate verification that the WTRU still has valid system information, or the WTRU may reacquire current value tags to ensure it has valid system information.

The WTRU may initiate a RACH procedure based on RACH parameters specific to the failed carrier. A successful RACH procedure (where the RACH response originates from the failed carrier) may then effectively translate in a successful recovery.

When a successful recovery has occurred, the WTRU may resume activity on the previously failed carrier and in particular evaluates in-synch/out-of-synch as per parameters previously used before the failure. If a UL carrier was paired with the recovered DL carrier for either HARQ feedback or scheduling on PDCCH, the associated UL carrier is also recovered.

Optionally, the WTRU may evaluate in-synch and out-of-synch indications for a limited duration, after which the in-synch and out-of-synch indications are no longer measured. This may be implemented by starting a new timer upon expiry of T310 and stopping in-synch/out-of-synch evaluation upon expiry of this timer. The value of the timer may be pre-defined or signaled by higher layers.

Optionally, the WTRU may evaluates in-synch and out-of-synch indications if, or as long as, the reference signal received power (RSRP) or reference signal received quality (RSRQ) measurement of the carrier is above a threshold, which may be pre-defined or signaled by higher layers.

When the WTRU stops evaluating in-synch and out-of-synch due to timer expiry or RSRP/RSRQ falling below a threshold as per the above, the WTRU may notify the network. Alternatively or in addition, the WTRU may act as if the carrier is "de-activated" and remove it from its connection configuration state in RRC.

In case the network explicitly de-activates the failed carrier, the WTRU may permanently stop measuring in-synch and out-of-synch.

Alternatively, if a new timer is not applied, the WTRU may continue the recovery until the network explicitly signals the WTRU to disable the recovery procedure. In this case, whenever the WTRU detects recovery of the DL carrier, it indicates to the revival by MAC or RRC signaling.

The network may attempt recovery of the failed carrier by sending DL assignments to the WTRU from time to time. Such DL assignments could, for example, consist of requests to initiate a RACH procedure where dedicated RACH parameters are provided and possibly system information related signaling (e.g., value tag or the information elements (IEs) from system information pertaining to the failed carrier).

The WTRU may monitor DL assignments from the network with certain restrictions to prevent excessive battery consumption. For example, the following restrictions may be used individually or in combination.

The WTRU may monitor DL assignments in certain subframes according to a known pattern pre-defined or pre-signaled by higher layers. The pattern may be periodic and may or may not correspond to the DRX configuration of the WTRU pertaining to the failed carrier prior to the occurrence of partial radio link failure.

The WTRU may monitor DL assignments if the signal strength and/or quality of the signal on the carrier are above a threshold, which may be pre-defined or pre-signaled by higher layers.

The WTRU may monitor DL assignments for a certain period of time after occurrence of partial radio link failure. The WTRU may consider that the carrier is "de-activated" and update its RRC connection configuration context accordingly after this period of time.

The WTRU may monitor DL assignments for a certain period of time after requesting recovery of the failed carrier by sending a message to the network (in case this scheme is used in conjunction with the previous one).

When the WTRU decodes an assignment from the network on the failed carrier, it may immediately consider that recovery is successful. Alternatively, the WTRU may consider that recovery is successful after completion of the RACH procedure subsequent to the reception of the DL assignment.

When successful recovery has occurred, the WTRU removes the monitoring restrictions and resumes monitoring PDCCH as per the configuration used before the failure.

In another method, the WTRU starts performing RSRP and/or RSRQ measurements on the frequency of the failed carrier according to some pre-determined measurement configuration. The WTRU may also interrupt measurements performed according to the measurement configuration defined for this frequency prior to the occurrence of partial radio link failure, if such configuration exists. The pre-determined measurement configuration (applicable to the partial radio link failure state of the carrier) may have been provided upon configuration and/or activation of this carrier. Alternatively, it may be a common measurement configuration applicable to any carrier for which partial radio link failure has occurred, and which is pre-defined or provided by dedicated or broadcast signaling. Alternatively, the measurement configuration is provided by the network upon detection (or notification by the WTRU) that partial radio link failure has occurred.

The measurement reports from the measurement configuration may be transmitted to one of the other carriers for which failure has not occurred. Based on the measurement reports, the network may initiate recovery of the failed carrier using RRC signaling and/or as per the previous embodiment.

In a system utilizing carrier aggregation it is possible that the WTRU initiates a RACH procedure in connected mode from an UL carrier to regain synchronization for its transmissions from the UL carrier. It is possible this occurs while the WTRU is still synchronized to the network for its transmissions from UL carriers.

The radio link failure condition for carrier aggregation may be modified based on one of the following methods when a random access problem occurs for a RACH procedure initiated from one of the configured UL carriers.

In one method, the WTRU considers radio link failure to be detected upon a random access problem, while none of the recovery timers $325$ (e.g., T300, T301, T304 nor T311) is running, and if the WTRU is not synchronized for its transmissions from any UL carrier. Thus, the timing advance timer is not running for any UL carrier.

In another method, the WTRU considers radio link failure to be detected upon a random access problem, while none of the recovery timers $325$ (e.g., T300, T301, T304 nor T311) is running, and if, for all or a subset of other UL carriers from which it is possible to initiate a RACH procedure (or as configured by the network), a random access problem has occurred after last expiry of the timing advance timer applicable to this carrier, (i.e., since the WTRU last lost synchronization for transmissions from this UL carrier).

Referring again to FIG. 3, the WTRU $100$ monitors for a radio link failure. The WTRU $100$ comprises a processor $255$ that may be configured to determine a primary DL carrier among a set of component carriers configured or activated for the WTRU $100$.

A first counter $330_1$ in the WTRU $100$ may be configured to count out-of-synch indications from the primary DL carrier. A recovery timer $325_1$ in the WTRU $100$ may be configured to be initiated on a condition that a predefined number of out-of-synch indications from the primary DL carrier was counted, as determined by the first counter $330_1$. A second counter $330_2$ in the WTRU $100$ may be configured to count in-synch indications from the primary DL carrier.

A radio link failure may be declared on a condition that a predefined number of in-synch indications from the primary DL carrier is not counted by the second counter before the recovery timer expires.

An RRC connection re-establishment procedure may be initialized, whereby the WTRU $100$ selects a cell corresponding to one of the component carriers for which a radio problem does not exist.

An RRC connection re-establishment message may be transmitted by initiating a random access channel (RACH) procedure using resources broadcast by a cell selected by the WTRU $100$ that corresponds to one of the component carriers for which a radio problem does not exist.

An SR may be transmitted on a PUCCH, and an RRC connection re-establishment message may be transmitted. The PUCCH may be allocated on a UL carrier paired to a DL carrier that does not have a radio problem.

The primary DL carrier may be selected from a plurality of DL carriers, wherein the selected primary DL carrier has the highest coverage among the plurality of DL carriers.

The primary DL carrier may be selected from a plurality of DL carriers, wherein the selected primary DL carrier provides PDCCH signaling.

The primary DL carrier may be selected from a plurality of DL carriers that are in DRX active time based on a predefined or signaled priority.

The primary DL carrier may be obtained from a network through RRC signaling.

A radio link failure may be declared on a condition that a predefined number of in-synch indications from the primary DL carrier is not counted by the second counter before the recovery timer expires, and either a connection re-establishment procedure or an RRC connection release procedure may be performed on a condition that a radio link failure is declared.

The recovery timer $325_1$ in the WTRU $100$ may be stopped on a condition that a predefined number of in-synch indications was received from the primary carrier before the recovery timer $325_1$ expires.

A primary re-establishment procedure may be performed on a condition that a predefined number of in-synch indications was not received from the primary carrier before the recovery timer expires.

Referring again to FIG. 3, the WTRU $100$ comprises a plurality of out-of-synch indication counters (e.g., $330_1$, $330_2$, $330_3$), configured to count out-of-synch indications from each of a plurality of PDCCH carriers activated for the WTRU. A recovery timer $325_1$ in the WTRU $100$ may be configured to be initiated on a condition that a predefined number of out-of-synch indications from a particular one of the PDCCH carriers was counted. An in-synch indication counter (e.g., $330_4$) may be configured to count in-synch indications from the particular PDCCH carrier.

A partial radio link failure associated with the particular PDCCH may be declared on a condition that the recovery timer $325_1$ expires before a predefined number of in-synch indications is counted.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method, implemented by a wireless transmit/receive unit (WTRU), of monitoring for a radio link failure, the method comprising:
    counting out-of-synch indications from each of a plurality of carriers with a physical downlink control channel (PDCCH) configured for the WTRU,
    wherein the plurality of carriers with PDCCH configured includes a primary carrier with PDCCH configured associated with a base station and at least one secondary carrier with PDCCH configured associated with another base station;
    initiating a recovery timer in the WTRU on a condition that a predefined number of out-of-synch indications from the at least one secondary carrier with PDCCH configured was counted;
    counting in-synch indications from the at least one secondary carrier with PDCCH configured; and
    transmitting a notification of radio link failure associated with the at least one secondary carrier with PDCCH configured to the primary carrier with PDCCH configured on a condition that the recovery timer expires before a predefined number of in-synch indications is counted.

2. The method of claim 1, wherein the primary carrier with PDCCH configured is selected from the plurality of carriers with PDCCH configured, wherein the selected primary carrier with PDCCH configured has the highest coverage among the plurality of carriers with PDCCH configured.

3. The method of claim 1, wherein the primary carrier with PDCCH configured is selected from the plurality of carriers with PDCCH configured that are in discontinuous reception (DRX) active time based on a predefined or signaled priority.

4. The method of claim 1, wherein the primary carrier with PDCCH configured is obtained from a network through radio resource control (RRC) signaling.

5. The method of claim 1, further comprising:
    performing either a connection re-establishment procedure or a radio resource control (RRC) connection release procedure on a condition that a radio link failure is declared.

6. The method of claim 1, further comprising:
    on a condition that a predefined number of in-synch indications was received from the at least one of the secondary component carriers before the recovery timer expires, stopping the recovery timer.

7. The method of claim 1, further comprising:
    on a condition that a predefined number of in-synch indications was not received from the at least one secondary carrier with PDCCH configured before the recovery timer expires, performing a primary re-establishment procedure.

8. A method, implemented by a wireless transmit/receive unit (WTRU), of monitoring for a radio link failure, the method comprising:
    counting out-of-synch indications from a primary component carrier and each of a plurality of secondary component carriers activated for the WTRU,
    wherein the primary component carrier and the plurality of secondary component carriers are associated with different base stations;
    initiating a recovery timer in the WTRU on a condition that a predefined number of out-of-synch indications from at least one of the secondary component carriers was counted;
    counting in-synch indications from the at least one of the secondary component carriers; and
    transmitting a radio link failure associated with the at least one of the secondary component carriers to the primary component carrier on a condition that the recovery timer expires before a predefined number of in-synch indications is counted.

9. The method of claim 8, wherein the primary component carrier is obtained from a network through radio resource control (RRC) signaling.

10. The method of claim 8, further comprising:
    performing either a connection re-establishment procedure or a radio resource control (RRC) connection release procedure on a condition that a radio link failure is declared.

11. The method of claim 8, further comprising:
    on a condition that a predefined number of in-synch indications was received from the at least one of the secondary component carriers before the recovery timer expires, stopping the recovery timer.

12. The method of claim 8, further comprising:
    on a condition that a predefined number of in-synch indications was not received from the at least one of the secondary component carriers before the recovery timer expires, performing a primary re-establishment procedure.

\* \* \* \* \*